(12) United States Patent
Ota et al.

(10) Patent No.: US 12,059,990 B2
(45) Date of Patent: Aug. 13, 2024

(54) ENTRANCE HANDRAIL

(71) Applicant: TOYOTA JIDOSHA KABUSHIKI KAISHA, Aichi-ken (JP)

(72) Inventors: Yuto Ota, Toyota (JP); Hideyuki Sakurai, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 67 days.

(21) Appl. No.: 17/982,407

(22) Filed: Nov. 7, 2022

(65) Prior Publication Data

US 2023/0173967 A1 Jun. 8, 2023

(30) Foreign Application Priority Data

Dec. 6, 2021 (JP) .................. 2021-198046

(51) Int. Cl.
*B60N 3/02* (2006.01)

(52) U.S. Cl.
CPC ............. *B60N 3/023* (2013.01); *B60N 3/026* (2013.01)

(58) Field of Classification Search
CPC ............. B60N 3/023; B60N 3/026; B60J 5/06
USPC ........................................................ 296/1.02
See application file for complete search history.

(56) References Cited

U.S. PATENT DOCUMENTS

| 11,198,382 | B2 * | 12/2021 | Song ...................... B60N 3/026 |
| 11,433,796 | B2 * | 9/2022 | Sakurai .................. B60N 3/023 |
| 11,613,195 | B2 * | 3/2023 | Sakurai .................. B60N 3/023 |
| | | | 16/110.1 |
| 11,654,209 | B2 * | 5/2023 | Sakurai ..................... A61L 2/10 |
| | | | 250/455.11 |
| 11,691,554 | B2 * | 7/2023 | Sakurai .................. B60N 3/023 |
| | | | 49/70 |
| 11,772,537 | B2 * | 10/2023 | Purushothama ....... B60N 3/023 |
| | | | 296/1.02 |
| 11,840,166 | B2 * | 12/2023 | Sakurai ..................... A61L 2/10 |
| 2021/0197701 | A1 | 7/2021 | Sakurai |
| 2022/0266735 | A1 | 8/2022 | Sakurai et al. |
| 2022/0289091 | A1 * | 9/2022 | Sakurai .................. B60N 3/023 |
| 2024/0067072 | A1 * | 2/2024 | Cai ......................... B60N 3/026 |

FOREIGN PATENT DOCUMENTS

| JP | H8118958 A | 5/1996 |
| JP | 2021104778 A | 7/2021 |
| JP | 2022130213 A | 9/2022 |

* cited by examiner

*Primary Examiner* — Jason S Morrow
(74) *Attorney, Agent, or Firm* — HAUPTMAN HAM, LLP

(57) ABSTRACT

The handrail for getting on and off includes a rail portion for slidably holding one end portion of the link arm which expands and contracts with the movement of the slide door, and a handrail body configured to rotate integrally with the rail portion. When the slide door closes the entrance, the entrance handrail takes a retracted posture in which one end portion of the link arm is located at the other end portion of the rail part and the handrail body is arranged along the slide door. When the slide door opens the entrance, the entrance handrail takes a deployed posture in which one end portion of the link arm is positioned on one end portion side of the rail portion so that the rail portion and the handrail body protrude toward the outside of the vehicle.

6 Claims, 18 Drawing Sheets

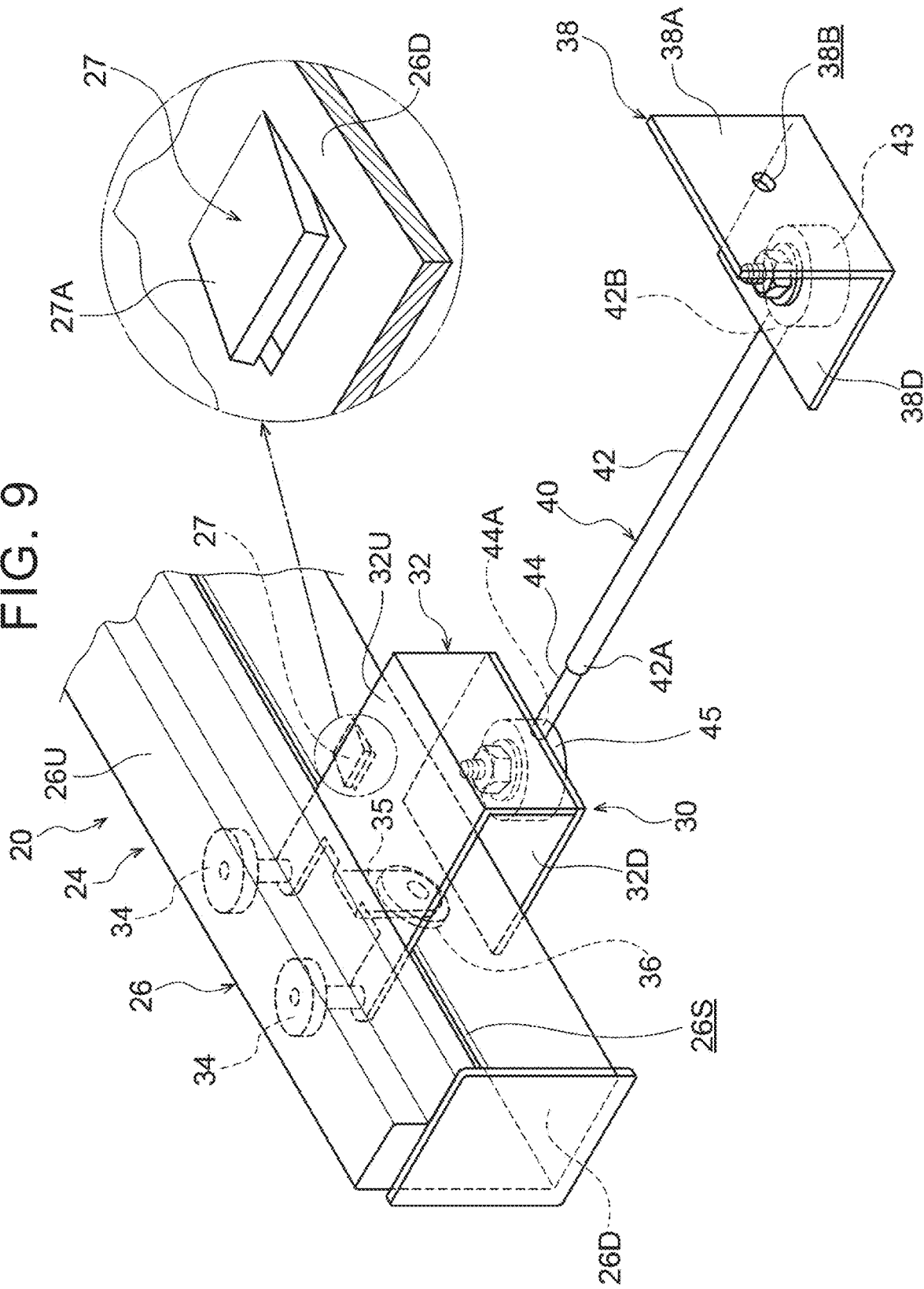

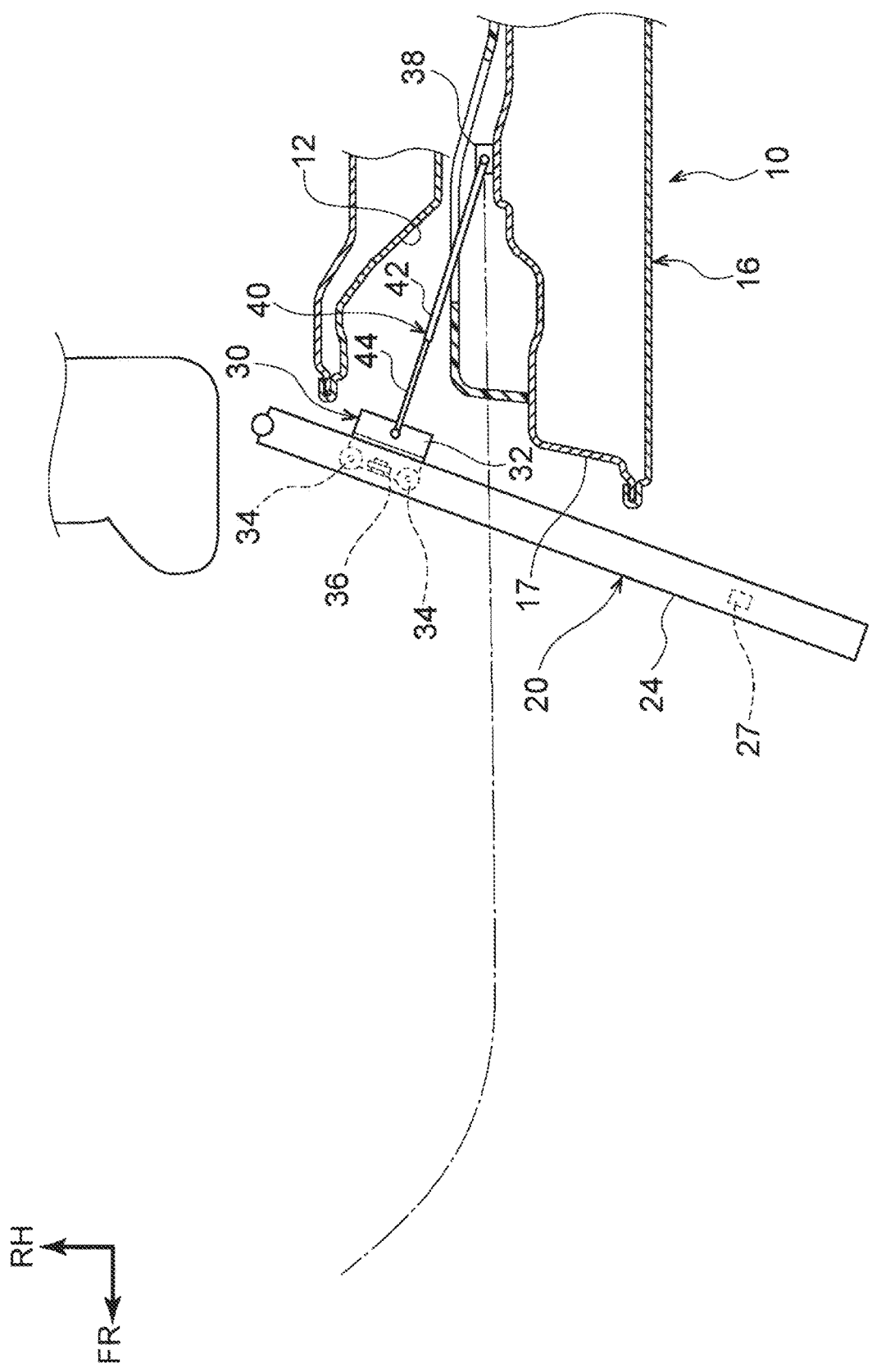

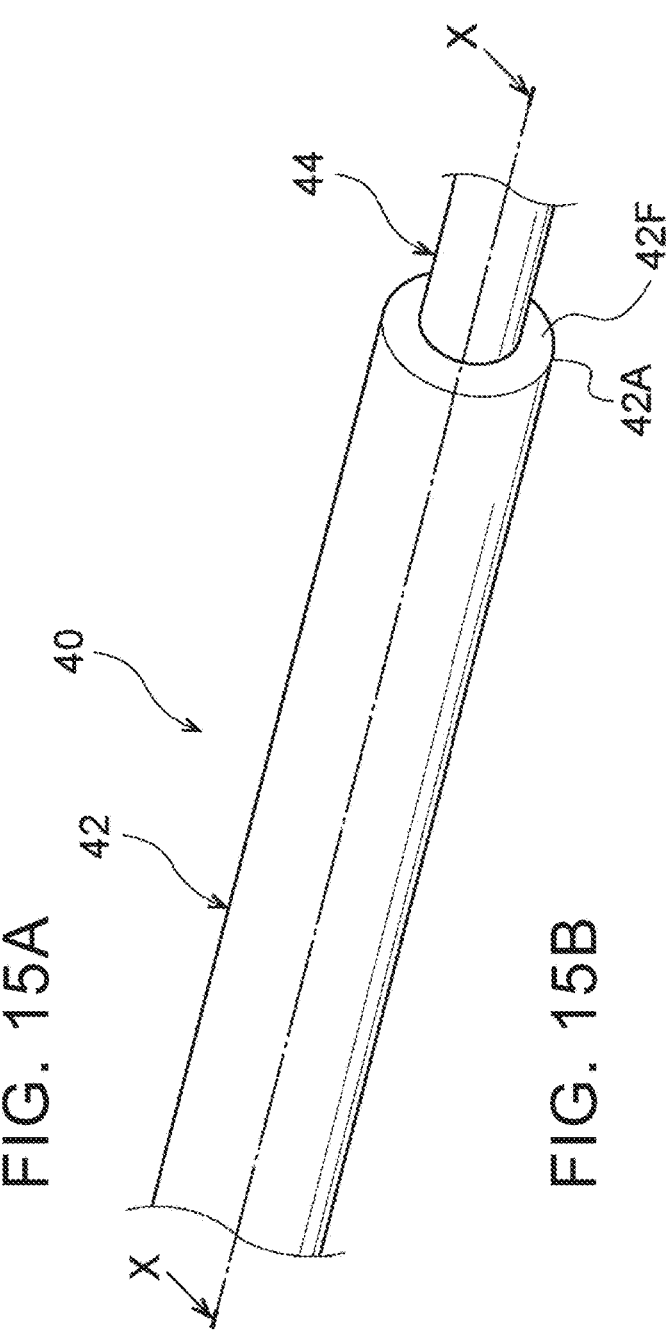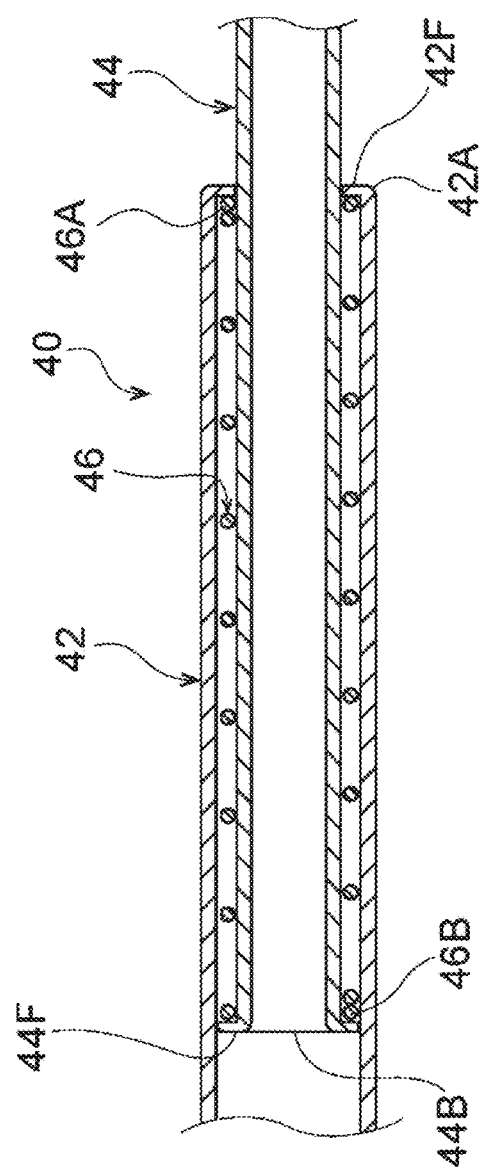
FIG. 15A
FIG. 15B

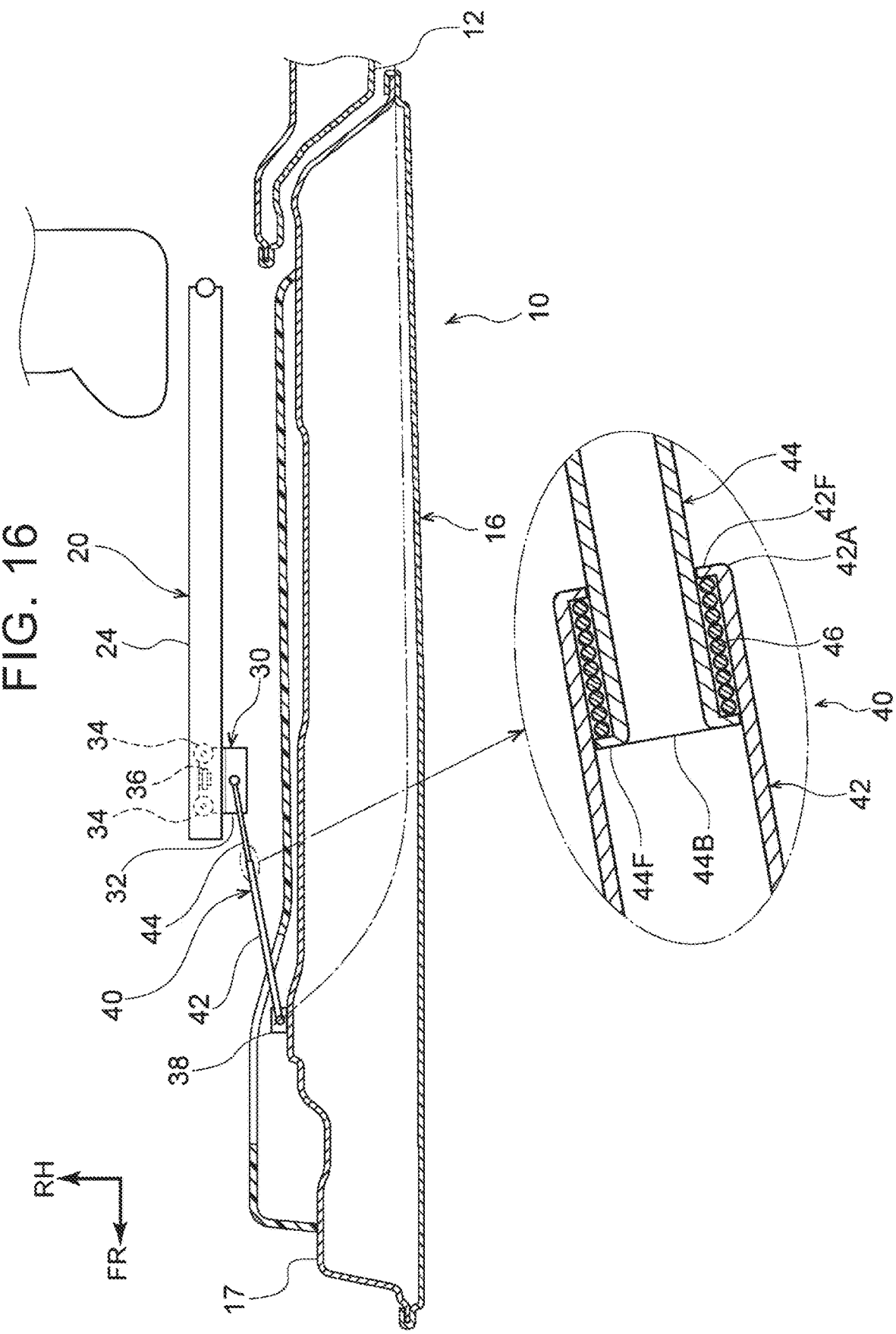

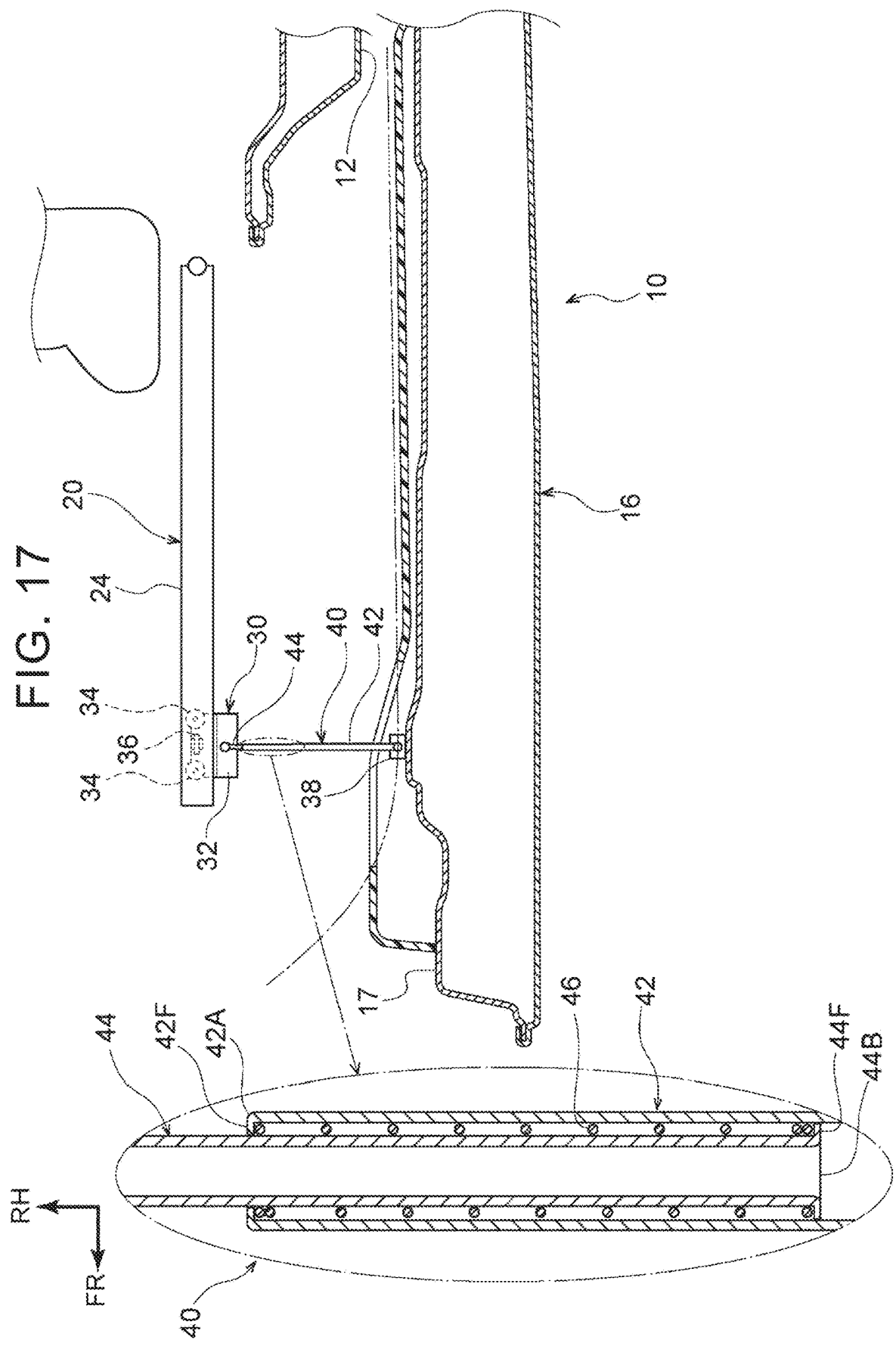

ENTRANCE HANDRAIL

CROSS-REFERENCE TO RELATED APPLICATION

This application claims priority to Japanese Patent Application No. 2021-198046 filed on Dec. 6, 2021, incorporated herein by reference in its entirety.

BACKGROUND

1. Technical Field

The present disclosure relates to an entrance handrail.

2. Description of Related Art

An entrance handrail that projects outward of a vehicle from an entrance of a bus in a state where a swing door is open and projects inward of the vehicle in a state where the swing door is closed to hinder entrance of a passenger through the entrance has been conventionally known (see, for example, Japanese Unexamined Patent Application Publication No. 8-118958 (JP 8-118958 A)).

SUMMARY

However, when an entrance handrail is provided in a vehicle such as a minivan having a slide door, a space in a vehicle cabin is reduced when the entrance handrail is configured to project inward of the vehicle as the slide door is closed. Further, when the entrance handrail is configured to project greatly outward of the vehicle as the slide door opens, the entrance handrail may hit a vehicle parked next to the minivan, for example.

Therefore, an object of the present disclosure is to suppress a reduction in the space in the vehicle cabin. In addition, an object of the present disclosure is to provide an entrance handrail that can suppress the amount of projection outward of the vehicle.

In order to achieve the above object, an entrance handrail according to claim 1 in the present disclosure includes
a rail portion of which one end portion is rotatably provided around an entrance of a vehicle with a vehicle body vertical direction as an axial direction, and of which the other end portion is rotatably attached to a slide door for opening and closing the entrance and holds one end portion of a link arm that expands and contracts with movement of the slide door such that the one end portion of the link arm is able to slide; and
a handrail body of which one end portion is rotatably provided around the entrance on a vehicle body upper side with respect to the one end portion of the rail portion with the vehicle body vertical direction as the axial direction, and that is configured to rotate together with the rail portion and that is able to be held by an occupant getting on and off the vehicle from the entrance, in which
in a plan view, in a state where the slide door closes the entrance, the rail portion and the handrail body are placed in a retracted posture in which the rail portion and the handrail body are positioned along the slide door with the one end portion of the link arm positioned on the other end portion side of the rail portion, and in a state where the slide door opens the entrance, the rail portion and the handrail body are placed in a deployed posture in which the rail portion and the handrail body project outward of the vehicle with the one end portion of the link arm positioned on the one end portion side of the rail portion.

In the disclosure according to claim 1, in the plan view, in a state where the slide door closes the entrance, the rail portion and the handrail body are placed in a retracted posture in which the rail portion and the handrail body are positioned along the slide door. That is, when the entrance handrail is placed in the retracted position, the rail portion and the handrail body do not project inward of the vehicle. Therefore, even when the entrance handrail is provided, a reduction in the space in the vehicle cabin is suppressed.

Further, in a state where the slide door opens the entrance, the rail portion and the handrail body are placed in a deployed posture in which the rail portion and the handrail body project outward of the vehicle. On the other hand, the link arm expands and contracts with movement of the slide door. Therefore, it is not necessary to adjust the length of the rail portion to the stroke of the link arm as compared with a configuration in which the link arm does not expand and contract. Therefore, the lengths of the rail portion and the handrail body can be shortened. In addition, the amount of projection of the entrance handrail outward of the vehicle is suppressed.

The entrance handrail according to claim 2 is the entrance handrail according to claim 1, and the one end portion of the link arm includes a rolling member that rolls in contact with an inner surface of the rail portion.

In the disclosure according to claim 2, the rolling member that rolls in contact with the inner surface of the rail portion is provided in the one end portion of the link arm. Therefore, the one end portion of the link arm can smoothly slide along the rail portion as compared with a case where the rolling member that rolls in contact with the inner surface of the rail portion is not provided in the one end portion of the link arm.

The entrance handrail according to claim 3 is the entrance handrail according to claim 2, and the rail portion includes a limiting structure for temporarily limiting rolling of the rolling member to the one end portion side of the rail portion.

In the disclosure according to claim 3, the rolling of the rolling member to the one end portion side of the rail portion is temporarily limit by the limiting structure provided in the rail portion. Therefore, the rail portion and the handrail body are pulled by the link arm and rotate from an initial stage when an opening motion of the slide door is performed. Therefore, a rotation speed when the rail portion and the handrail body rotate outward of the vehicle is reduced as compared with a configuration in which the rail portion and the handrail body are pulled by the link arm and rotate at a final stage when the opening motion of the slide door is completed.

The entrance handrail according to claim 4 is the entrance handrail according to claim 3, and
the limiting structure is composed of a protrusion provided on the rail portion, and the protrusion is configured such that the rolling member climbs over the protrusion, when the one end portion of the link arm is pulled with a predetermined force to the one end portion side of the rail portion.

In the disclosure according to claim 4, the limiting structure is composed of the protrusion provided on the rail portion. Then, when the one end portion of the link arm is pulled with the predetermined force to the one end portion side of the rail portion, the protrusion is configured such that the rolling member climbs over the protrusion. Therefore, a configuration of the limiting structure is simplified, and a manufacturing cost of the entrance handrail is reduced as compared with a configuration in which such a protrusion is not provided.

The entrance handrail according to claim 5 is the entrance handrail according to claim 1 or 2, and the link arm includes an urging member for urging the link arm in a direction in which an overall length of the link arm is shortened.

In the disclosure according to claim 5, the urging member provided in the link arm urges the link arm in the direction in which the overall length of the link arm is shortened. Therefore, the link arm is unlikely to extend even though the above-described limiting structure is not provided. As a result, the rail portion and the handrail body are pulled by the link arm and rotate from the initial stage when the opening motion of the slide door is performed. Therefore, a rotation speed when the rail portion and the handrail body rotate outward of the vehicle is reduced as compared with a configuration in which the rail portion and the handrail body are pulled by the link arm and rotate at a final stage when the opening motion of the slide door is completed.

Further, the entrance handrail according to claim 6 is the entrance handrail according to any one of claims 1 to 5, and the handrail body is configured to rotate together with the rail portion when the other end portion of the handrail body and the other end portion of the rail portion are integrally coupled.

In the disclosure according to claim 6, the other end portion of the handrail body and the other end portion of the rail portion are integrally coupled to each other. Therefore, support rigidity relative to the handrail body is improved as compared with a case where the other end portion of the handrail body and the other end portion of the rail portion are not integrally coupled.

As described above, according to the present disclosure, it is possible to suppress the reduction in the space in the vehicle cabin even when the entrance handrail is provided. In addition, according to the present disclosure, the amount of projection of the entrance handrail outward of the vehicle can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 is an enlarged perspective view illustrating a rail portion of the entrance handrail according to the second embodiment;

FIG. 14 is a plan view schematically showing a state of an entrance handrail according to the second embodiment when the slide door opens the entrance;

FIG. 15A is a perspective view showing a part of a link arm of an entrance handrail according to a third embodiment;

FIG. 15B is a cross-sectional view taken along the X-X line of FIG. 15A;

FIG. 16 is a plan view schematically showing the attitude of the entrance handrail according to the third embodiment when the slide door closes the entrance;

FIG. 17 is a plan view schematically showing a state of an entrance handrail according to a third embodiment during opening of a slide door;

DETAILED DESCRIPTION OF EMBODIMENTS

Hereinafter, embodiments according to the present disclosure will be described in detail based on the drawings. Incidentally, for convenience of explanation, the arrow UP shown as appropriate in each diagram is a vehicle body upward direction. Further, the arrow FR is a vehicle body front direction. Furthermore, the arrow RH is the vehicle body right direction. In the following description, when the directions of up and down, front and rear, and right and left are described unless otherwise specified, the terms indicate up and down in a vehicle body vertical direction, front and rear in a front-rear direction of the vehicle body, and right and left in a right-left direction (vehicle width direction) of the vehicle body.

Figure 1:
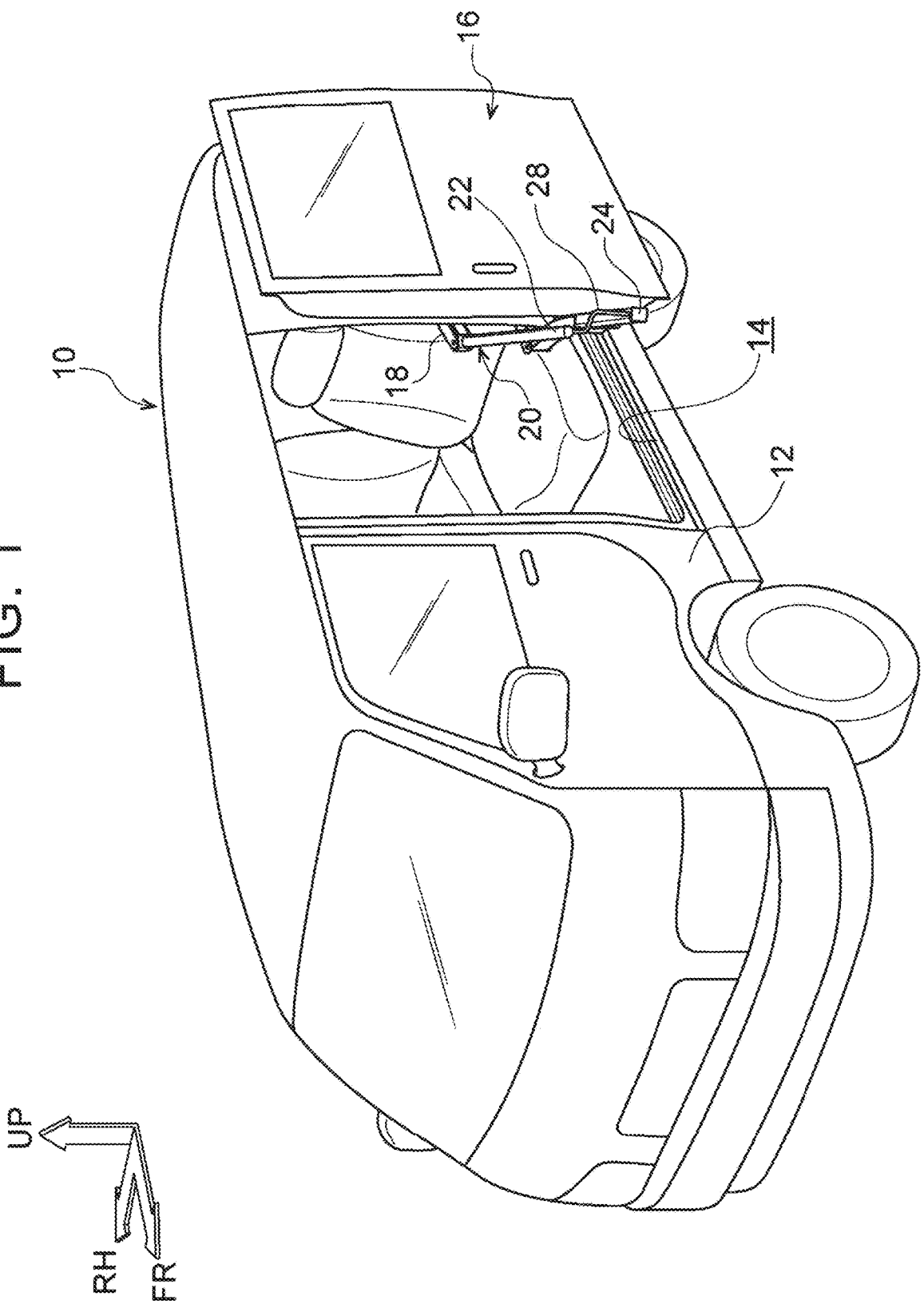
FIG. 1 is a perspective view showing a minivan having an entrance handrail according to an embodiment of the present disclosure and having an entrance and exit opened.

As shown in FIG. 1, the entrance handrail 20 according to the present embodiment is suitably provided for a minivan 10 as an example of a vehicle. Therefore, in the present embodiment, the vehicle will be described as the minivan 10. However, the entrance handrail 20 according to the present embodiment is applicable to a vehicle having the slide door 16 in general.

First Embodiment

Figure 2:
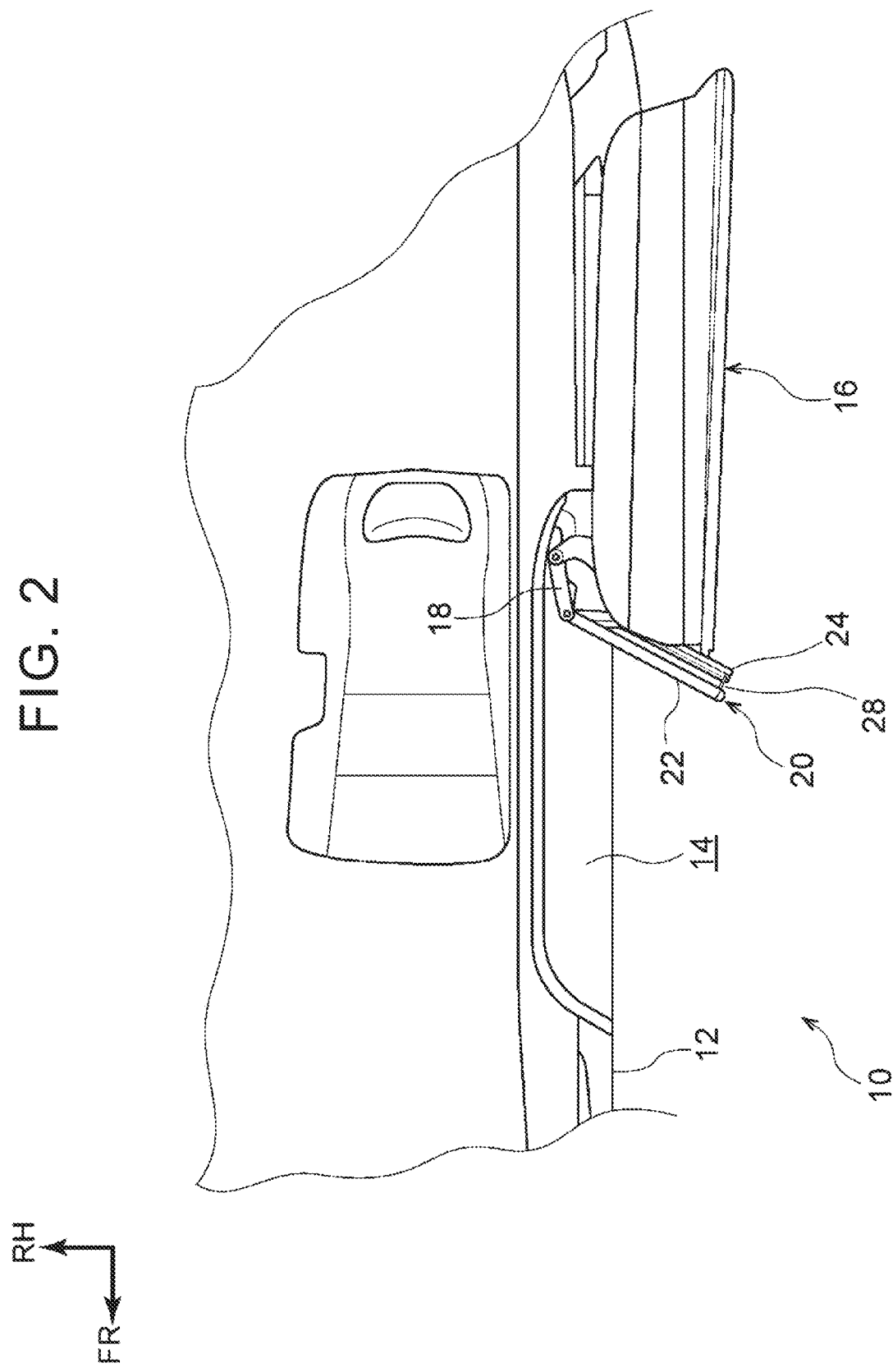
FIG. 2 is a plan view showing a part of a minivan provided with an entrance handrail according to the present embodiment and having an entrance and exit opened.

First, a first embodiment will be described. 1, as shown in FIG. 2, the left side wall of the vehicle body 12 in the minivan 10 (outer wall), and in the front-rear direction substantially central portion, the entrance 14 is formed. Then, by moving along a substantially longitudinal direction, the slide door 16 for opening and closing the entrance 14 is provided on the minivan 10.

Slide door 16 is slidably supported in the longitudinal direction by a rail or the like (not shown) provided on the vehicle body 12. Further, the slide door 16 opens the entrance 14 by sliding to the rear side along the left side wall of the vehicle body 12. From a state where the entrance 14 is opened, by sliding to the front side along the left side wall of the vehicle body 12, the slide door 16 is configured to be able to close the entrance 14.

Further, take the retracted posture disposed along the slide door 16 on the inner side of the entrance 14 when closing the slide door 16 (vehicle width direction inner), the entrance handrail 20 for taking a deployed posture protruding outward from the entrance 14 when the opening of the slide door 16 (vehicle width direction outer) is provided on the minivan 10.

When the entrance 14 by the slide door 16 is slid to the rear side is opened, so as to protrude toward the vehicle width direction outward from the entrance 14 in conjunction with the opening operation (so as to take a deployed posture) the entrance handrail 20 is configured. When the slide door 16 is slid to the front side to close the entrance 14, the entrance handrail 20 is configured so as to return to the original state in conjunction with the closing operation (so as to take the retracted posture).

Figure 3:
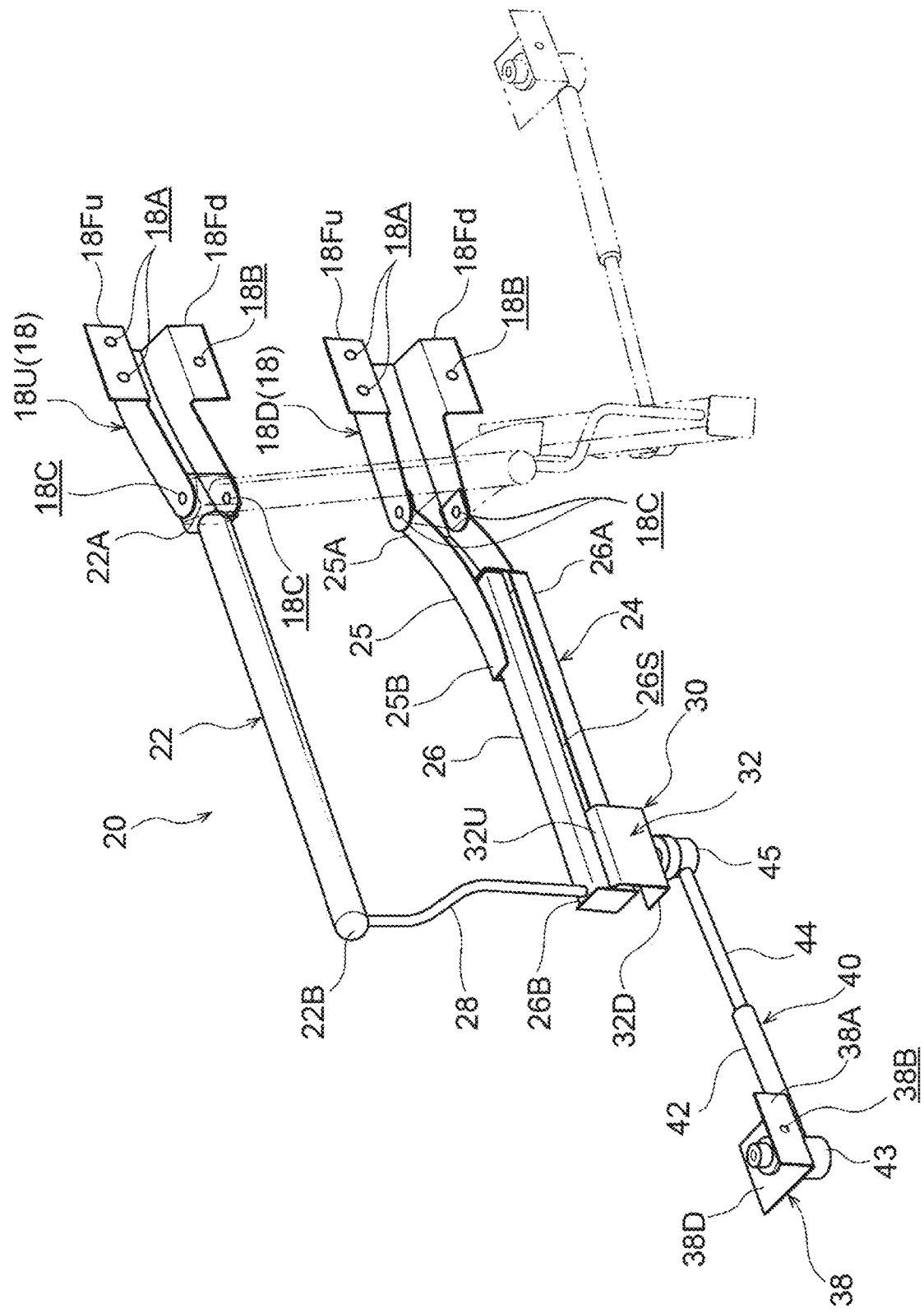
FIG. 3 is a perspective view showing an entrance handrail according to the first embodiment.

As shown in FIG. 3, as the passenger getting on and off from the entrance 14 can be gripped, the entrance handrail 20 includes a handrail body 22 which is a bar-shaped member of the cross-sectional circular extending in the horizontal direction and a rail portion 24 extending in the horizontal direction on the lower side of the handrail body 22. Note that the handrail body 22 and the rail portion 24 are made of metal (for example, aluminum). Therefore, a protective member (not shown) made of urethane, vinyl chloride, or the like may be wound around the handrail body 22 so as to be easily gripped by an occupant (so as to make it difficult to feel cold).

Rail portion 24, the other end portion 25B to one end portion 26A of the rail portion body 26 and the rail portion body 26 is a substantially square tubular member for slidably holding the slide member 30 provided at one end portion of the link arm 40 to be described later is formed by a connecting member 25 having a substantially U-shaped cross section. Specifically, one end portion 26A of the rail portion body 26 is fitted into the interior of the other end portion 25B of the connecting member 25, the rail portion 24 is constituted by being integrally joined by welding or the like. Incidentally, the rail portion 24 is not intended to be gripped by the occupant.

Then, one end portion 25A of one end portion 22A and the connecting member 25 of the handrail body 22 (rail portion 24) is supported around the respective entrances 14. Specifically, a pair of upper and lower brackets 18 fixed to a portion of the vehicle body 12 constituting the rear portion of the entrance 14 (e.g., C-pillar), one end portion 25A of one end portion 22A and the connecting member 25 of the handrail body 22 (rail portion 24) is rotatably supported in the vertical direction as an axial direction. Front side of each bracket 18 is formed in a substantially U-shaped cross section. Rear side of each bracket 18 is formed in a substantially hat-shaped cross section.

The upper flange portion 18Fu at the rear side of the brackets 18 formed in a substantially hat-shaped cross section, two through-hole 18A are formed at predetermined intervals in the longitudinal direction. The front-rear central portion of the lower flange-portion 18Fd, one through-hole 18B is formed. Therefore, in each of the brackets 18, a fastener such as a bolt is inserted into each of the through-holes 18A, 18B, and is screwed into a weld nut or the like provided in a part (e.g., C-pillar) of the vehicle body 12. As a result, the rear portion side is fixed to a part of the vehicle body 12 (for example, the C pillar).

On the other hand, the front end portion of the brackets 18 formed in a substantially U-shaped cross section, the through-hole 18C penetrating vertically is formed. Then, also on one end portion 22A of the handrail body 22, a through hole penetrating vertically (not shown) is formed. Also on one end portion 25A of the connecting member 25, a through hole penetrating vertically (not shown) is formed.

Therefore, when the upper bracket 18 is the upper bracket 18U, its one end portion 22A is inserted into the front end portion of the upper bracket 18U, fasteners such as bolts are inserted into the respective through-holes are screwed into nuts or the like. Thus, the handrail body 22 is rotatably supported to the front end portion of the upper bracket 18U in the vertical direction as an axial direction.

When the lower side of the bracket 18 is a lower bracket 18D, its one end portion 25A is inserted into the front end portion of the lower bracket 18D, fasteners such as bolts are inserted into the respective through-holes and is screwed into the nut or the like. Thus, the connecting member 25 is rotatably supported in the vertical direction to the front end portion of the lower bracket 18D as an axial direction.

Incidentally, the other end portion 26B of the other end portion 22B and the rail portion body 26 of the handrail body 22 (rail portion 24) is integrally coupled by an elongated substantially cylindrical coupling member 28 extending in the vertical direction. Thus, on the upper side of the rail portion 24, the handrail body 22 is configured to rotate with the rotation of the rail portion 24. That is, the rail portion 24 and the handrail body 22 is configured to rotate integrally.

Further, the outer wall of the rail portion body 26 constituting the rail portion 24 (facing the vehicle width direction outer when the retracted posture, the outer wall facing substantially rear side when the deployed posture), the slit portion 26S extending in the longitudinal direction of the rail portion body 26 is formed over the entire length. The slide member 30 is provided in the rail portion body 26 so as to be reciprocally movable (slidable) along the slit portion 26S. The width of the slit portion 26S (vertical gap) is formed slightly larger than the thickness of the upper wall portion 32U to be described later.

As shown in detail in FIG. 9, the slide member 30 includes a substantially U-shaped plate portion 32 having a lower wall portion 32D disposed on the lower surface side of the upper wall portion 32U and the rail portion body 26 which is inserted into the slit portion 26S is slidably held in the rail portion body 26. A distal end of the upper wall portion 32U is formed in a bifurcated shape. In addition, a support portion 35 bent downward is formed therebetween.

The distal end of the upper wall portion 32U which is bifurcated, the sub-roller 34, each of which is a vertical direction in the axial direction, is rotatably provided. Each sub-roller 34 is capable of rolling along the inner surface of the upper wall portion 26U of the rail portion body 26. Then, the lower end of the support portion 35, the main roller 36 as a rolling member for making the horizontal direction in the axial direction is rotatably provided. Main roller 36 is capable of rolling along the inner surface of the lower wall portion 26D of the rail portion body 26 (bottom surface).

Further, the lower wall portion 32D of the plate portion 32, the ring portion 45 provided on one end portion 44A of the small-diameter rod 44 constituting the link arm 40 (described later) is rotatably connected in the vertical direction as an axial direction. Link arm 40, one end portion 42A of the cylindrical large-diameter rod 42, the other end portion 44B of the cylindrical small-diameter rod 44 (see 15A and 15B in the drawing) side is slidably fitted and a double pipe structure. The link arm 40 is configured to be stretchable by the action of an external force applied in the axial direction.

On one end portion 44A of the small-diameter rod 44, a cylindrical ring portion 45 penetrating vertically is integrally provided. Its ring portion 45 is rotatably connected in the vertical direction as an axial direction by a fastener such as bolts and nuts to the lower wall portion 32D of the plate portion 32. Then, also on the other end portion 42B of the large-diameter rod, a cylindrical ring portion 43 penetrating vertically is integrally provided. Its ring portion 43 is rotatably connected in the vertical direction as an axial direction by a fastener such as bolts and nuts to the lower wall portion 38D of the plate portion 38 to be described later.

As shown in FIGS. 4 to 8, the plate portion 38 is secured to the front side of the inner panel 17 of the slide door 16 by fasteners such as bolts and nuts. That is, as shown in FIGS. 3 and 9, the plate portion 38 is formed in a substantially "L" shape in cross section. Through-hole 38B is formed in the central portion of the upright portion 38A extending upward.

On the other hand, a through-hole (not shown) is also formed on the front side of the inner panel 17. A weld nut (not shown) is coaxially provided in the through hole. Therefore, the through-hole 38B and the through-hole of the inner panel 17 are bolted and screwed into the weld nut, whereby the plate portion 38 is fixed to the inner panel 17.

Next, the operation of the entrance handrail 20 according to the first embodiment configured as described above will be described.

Incidentally, in FIGS. 4 to 8, as the entrance handrail 20, showing only the rail portion 24. Incidentally, the handrail body 22, for rotating integrally with the rail portion 24 at the upper side of the rail portion 24, the operation is the same as the rail portion 24. Therefore, the following description is referred to as "handrail body 22 and the rail portion 24" even if only the rail portion 24 is illustrated.

Figure 4:
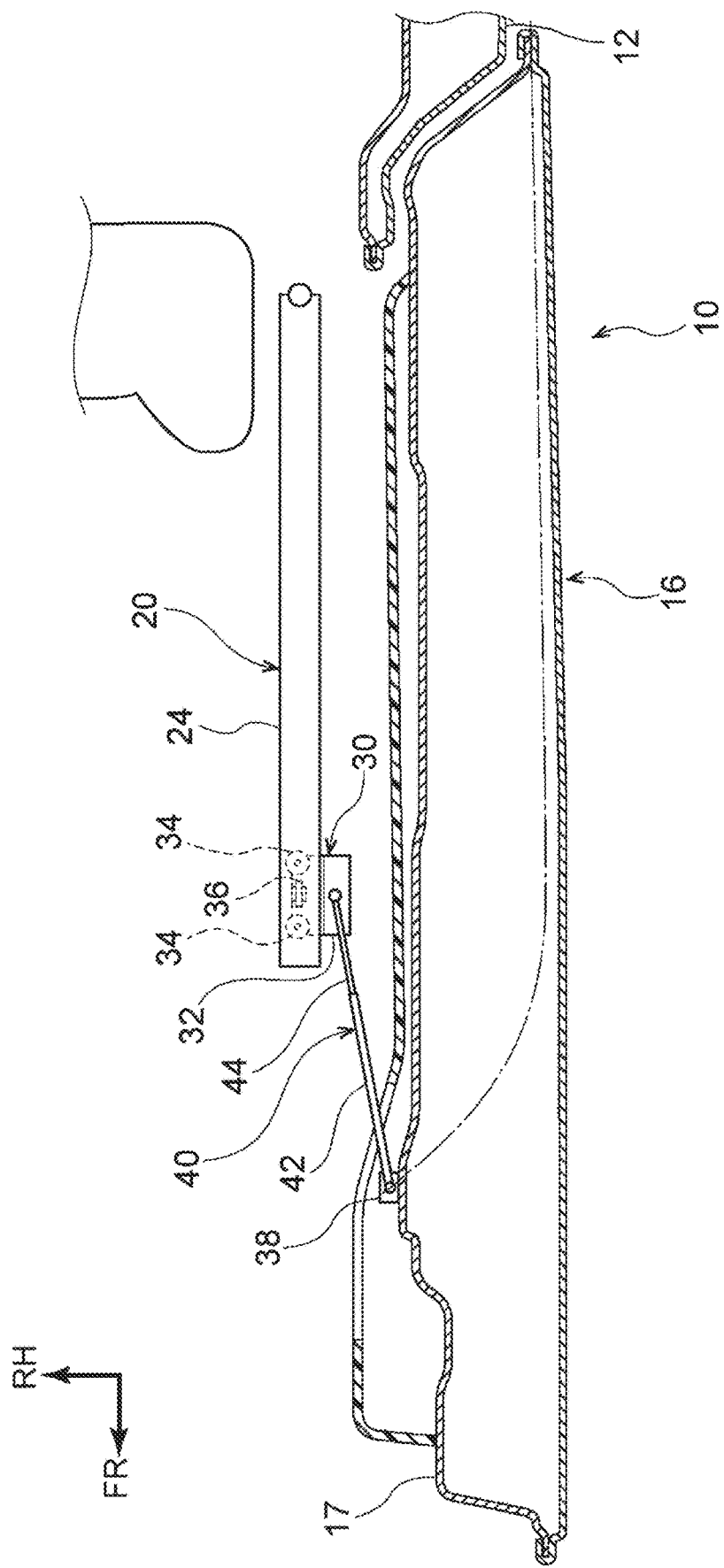
FIG. 4 is a plan view schematically showing the attitude of the entrance handrail according to the first embodiment when the slide door closes the entrance.

As shown in FIG. 4, when the entrance 14 is closed by the slide door 16, the entrance handrail 20 is disposed substantially along the slide door 16 in front view and in plan view. Specifically, in a state where the slide door 16 closes the entrance 14, the slide member 30 provided at one end portion of the link arm 40, the other end portion 26B of the rail portion 24 (rail portion body 26) (see FIG. 3: hereinafter the same) It is located on the side. Handrail body 22 and rail portion 24 takes a retracted posture disposed along the slide door 16.

That is, when the retracted posture is taken, in the entrance handrail 20, the handrail body 22 and the rail portion 24 does not protrude toward the vehicle interior (vehicle cabin side). Therefore, even if the entrance handrail 20 is provided in the minivan 10, it is possible to suppress the space in the vehicle cabin is reduced.

In other words, it is possible to prevent the space in the vehicle cabin from being restricted by the entrance handrail 20. At this time, the link arm 40 has a state in which the small-diameter rod 44 is pulled out to the maximum from the inside of the large-diameter rod 42, the link arm 40 has a maximum length of the link arm 40.

Figure 5:
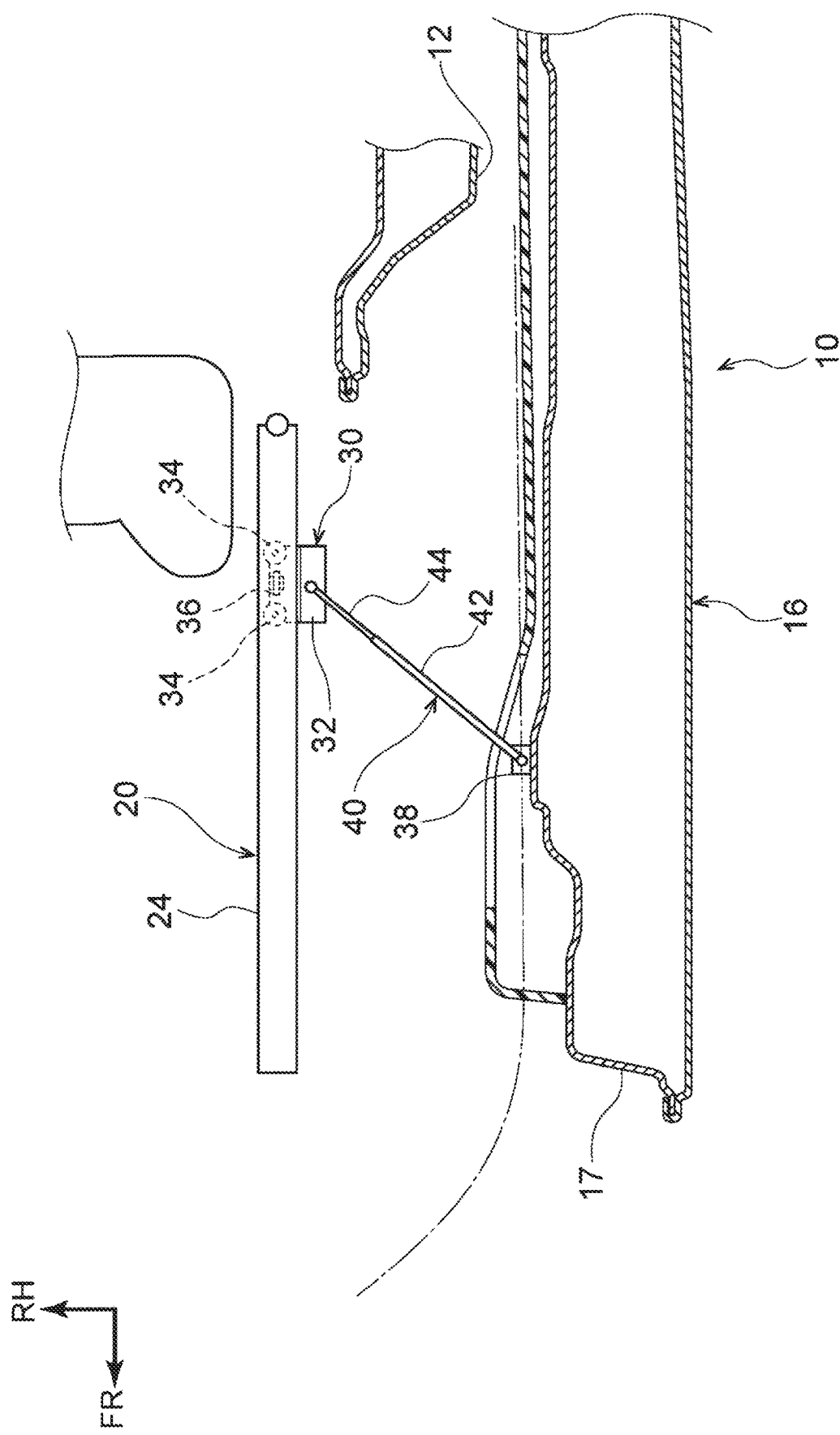
FIG. 5 is a plan view schematically showing a state of the entrance handrail according to the first embodiment during opening of the slide door.

As shown in FIG. 5, when the entrance 14 begins to be opened by the slide door 16, while its maximum length is maintained, the slide member 30 provided at one end portion of the link arm 40 along the rail portion 24 (rail portion body 26), the link arm 40, one end portion 26A of the rail portion 24 (rail portion body 26) (see FIG. 3: hereinafter the same) slide toward the side. That is, while the sub-roller 34 and the main roller 36 is rolling the inner surface of the rail portion body 26, the sub-roller 34 and the main roller 36 is moved to one end portion 26A of the rail portion body 26.

Thus, the one end portion of the link arm 40 (slide member 30), if the sub-roller 34 and the main roller 36 rolling in contact with the inner surface of the rail portion 24 (rail portion body 26) is provided, one end portion of the link arm 40 (slide member 30), the inner surface of the rail portion 24 (rail portion body 26) as compared with the case where the sub-roller 34 and the main roller 36 rolling in contact with is not provided, one end portion of the link arm 40 (slide member 30) can be moved smoothly along the rail portion 24 (rail portion body 26).

Figure 6:
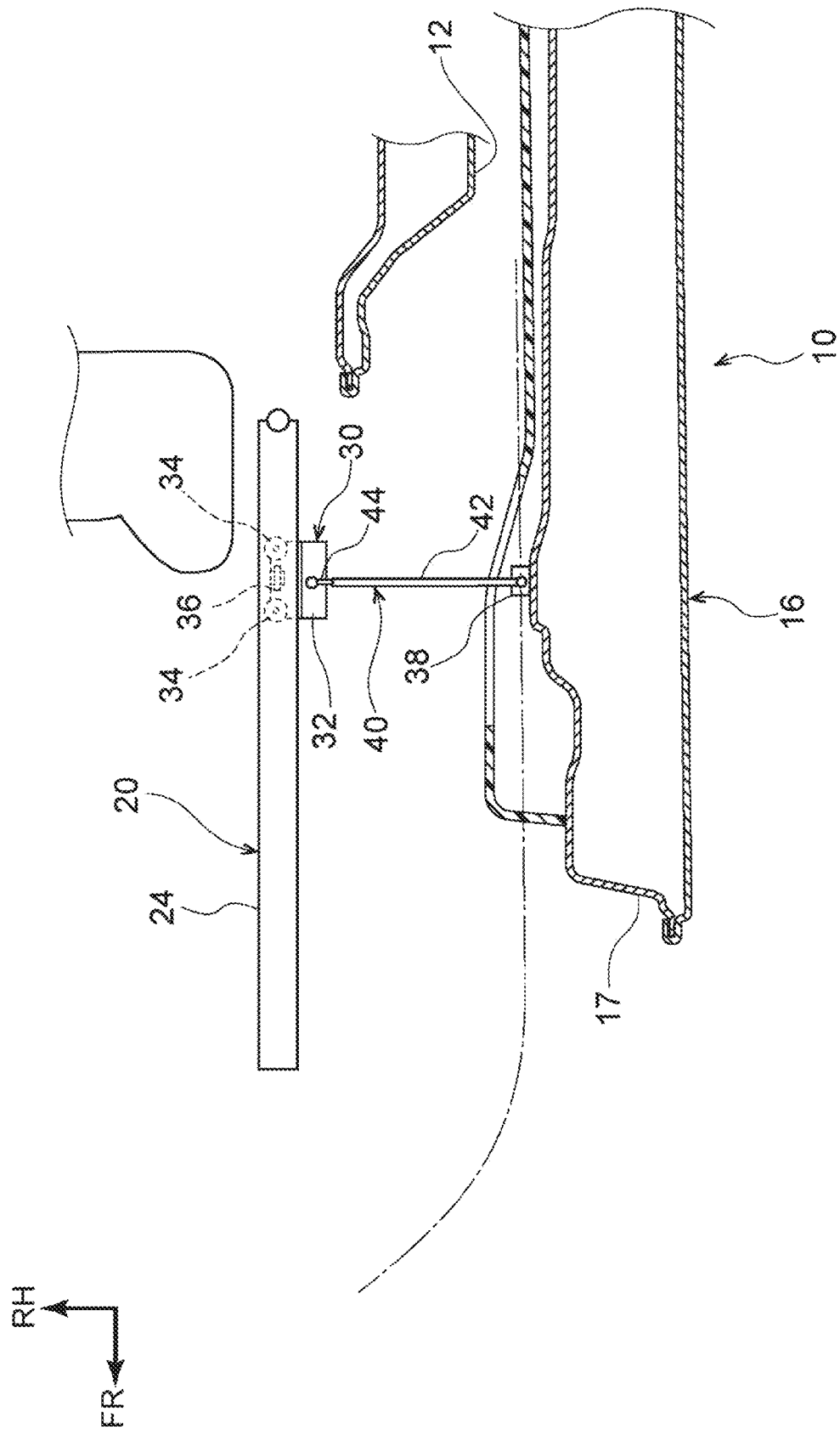
FIG. 6 is a plan view schematically showing a state of the entrance handrail according to the first embodiment during opening of the slide door.

Then, as shown in FIG. 6, when the slide door 16 is moved further rearward, the slide member 30 cannot move any more. Therefore, the slide member 30, while being positioned at one end portion 26A of the rail portion 24 (rail portion body 26), the link arm 40 is shortened. That is, the movement of the slide door 16, relatively small-diameter rod 44 is pressed toward the large-diameter rod 42 (with respect to the link arm 40, an external force acting toward its axial inward), the small-diameter rod 44 is housed therein. At this time, the link arm 40 has a minimum length.

Figure 7:
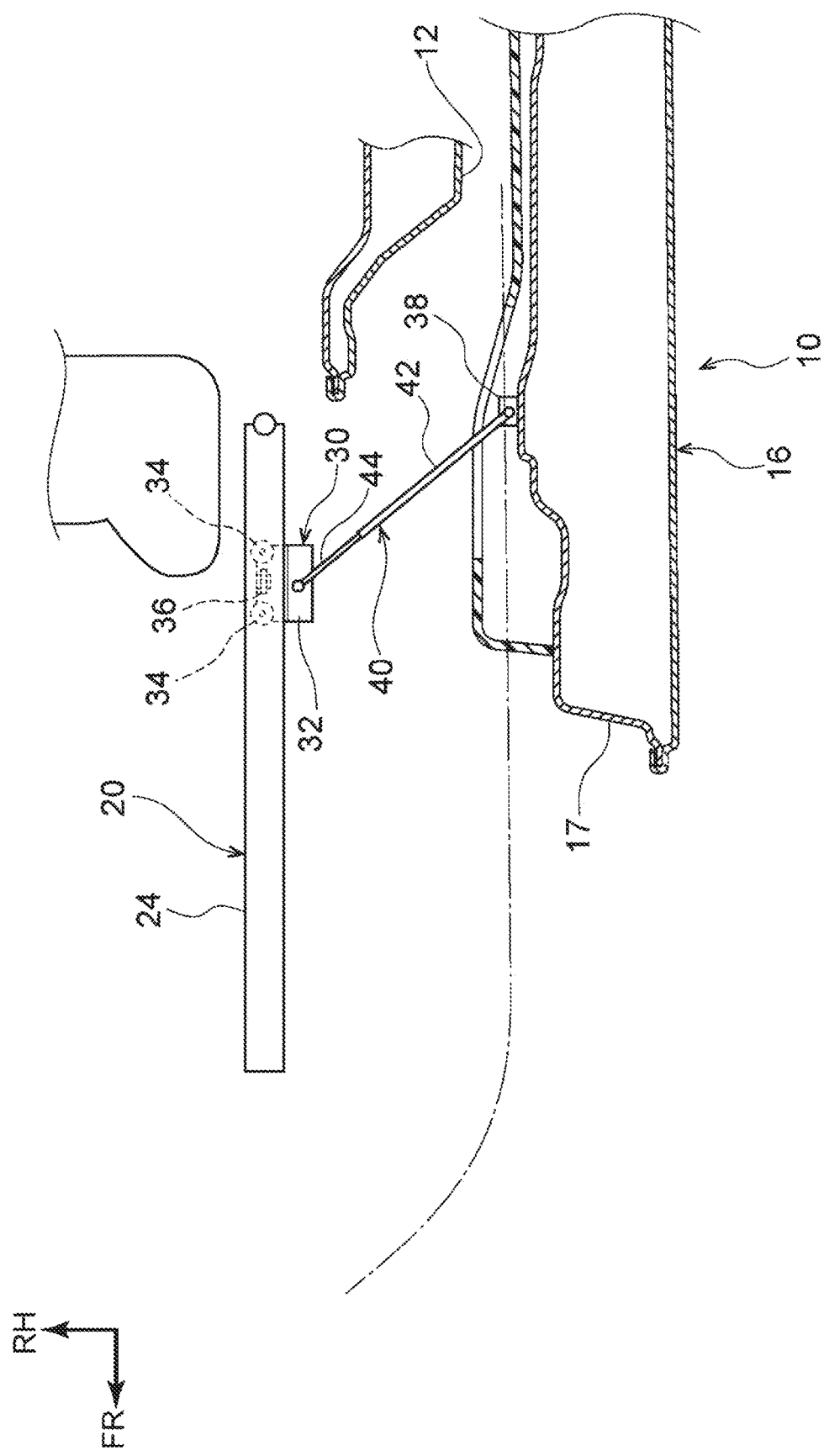
FIG. 7 is a plan view schematically showing a state of the entrance handrail according to the first embodiment during opening of the slide door.

Then, as shown in FIG. 7, when the slide door 16 is moved further rearward, while the slide member 30 is positioned at one end portion 26A of the rail portion 24 (rail portion body 26), the link arm 40 is extended. That is, the movement of the slide door 16, relatively small-diameter rod 44 is pulled out from the inside of the large-diameter rod 42 (with respect to the link arm 40, an external force toward the axial outside thereof acts). At this time, the link arm 40 becomes the maximum length again.

Figure 8:
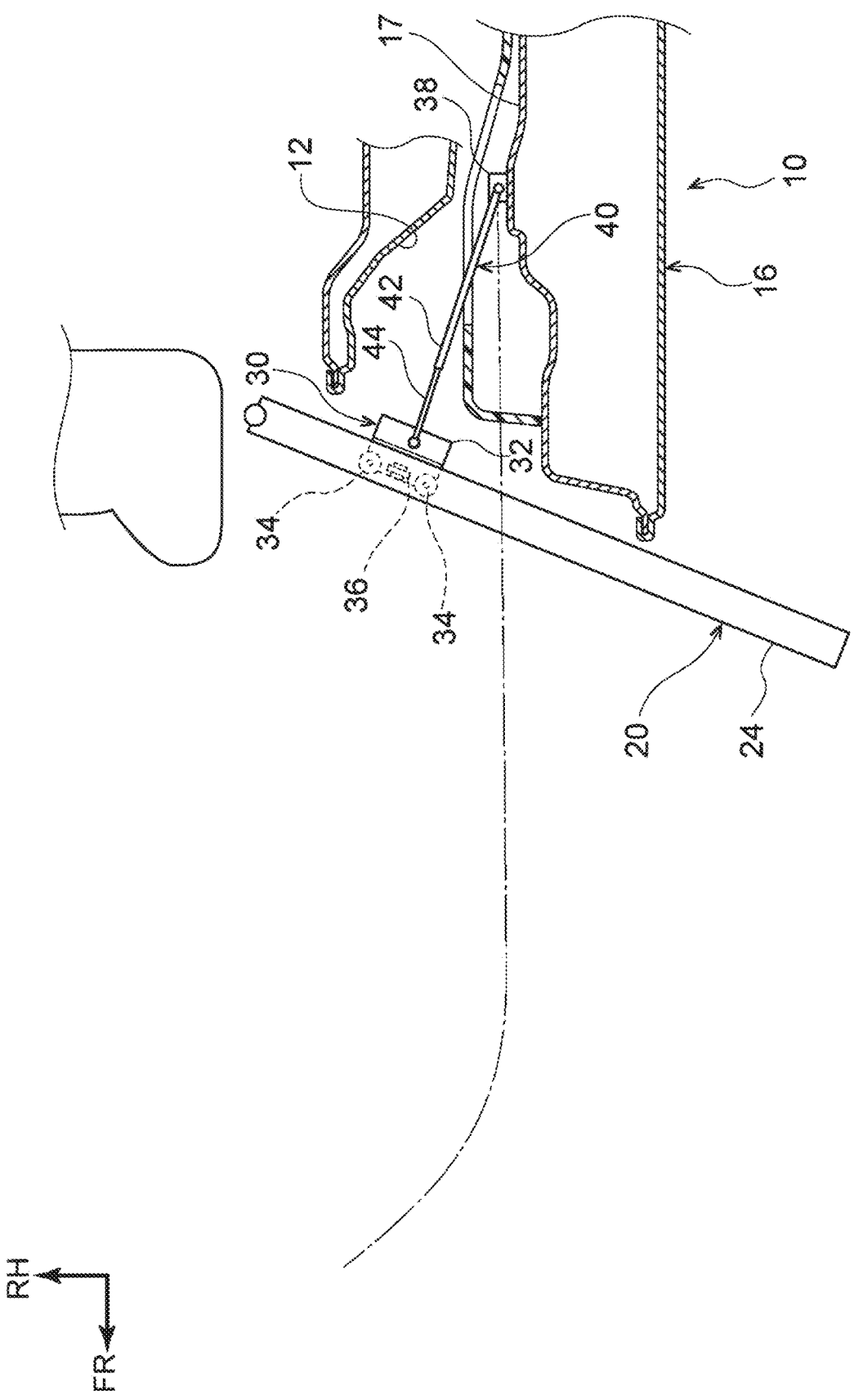
FIG. 8 is a plan view schematically showing a state of an entrance handrail according to the first embodiment when the slide door opens the entrance.

Then, as shown in FIG. 8, when the slide door 16 is further moved rearward to open the entrance 14, the slide member 30 remains positioned at one end portion 26A of the rail portion 24 (rail portion body 26), the link arm 40 can not be extended any more. Therefore, through the link arm 40, the rail portion 24 (rail portion body 26) is pulled.

Thus, in the rail portion 24 (rail portion body 26 and the connecting member 25), its one end portion 25A (see FIG. 3: hereinafter the same) side the other end portion 26B as a pivot fulcrum is rotated toward the outside of the vehicle (vehicle width direction outer). That is, at the final stage when the opening operation of the slide door 16 is completed, take a deployed posture handrail body 22 and the rail portion 24 is projected toward the outside of the vehicle.

Thus, when the entrance handrail 20 takes the deployed posture, the occupant can grip the handrail body 22 when getting on and off the minivan 10. This facilitates getting on and off the minivan 10 (the attitude can be stabilized and getting on and off). In particular, the occupant stands on one foot at the moment of lowering one foot when getting off. Therefore, when the handrail body 22 is provided, the occupant can easily apply force and stabilize the posture. Incidentally, the handrail body 22 is formed in a circular cross section. Therefore, for example, as compared with the case of being formed in a cross-sectional square shape, the occupant is easily gripped.

Further, as described above, the link arm 40 expands and contracts as the slide door 16 moves. Therefore, as compared with the configuration in which the link arm 40 does not expand and contract with the movement of the slide door 16, the length of the rail portion 24 (rail portion body 26) need not be matched to the stroke of the link arm 40. That is, in the case where the link arm 40 does not expand and contract with the movement of the slide door 16, the slide member 30 must be further slid toward one end portion of the rail portion 24. Therefore, inevitably the length of the rail portion 24 is increased.

In contrast, as shown in FIG. 6, the link arm 40 in the first embodiment can take a shortened state with the movement of the slide door 16. Therefore, it is not necessary to take a long distance to slide the slide member 30 to one end portion side of the rail portion 24. Therefore, the length of the handrail body 22 and the rail portion 24 can be reduced, and as a result, the amount of protrusion of the entrance handrail 20 to the outside of the vehicle can be suppressed.

Further, in the entrance handrail 20, the other end portion 26B of the other end portion 22B and the rail portion 24 of the handrail body 22 (rail portion body 26) is integrally coupled by a coupling member 28. Thus, the handrail body 22 can be pivoted with the rail portion 24 as compared to when the other end portion 22B of the handrail body 22 and the other end portion 26B of the rail portion 24 are not integrally coupled by the coupling member 28. Additionally, the rail portion 24 may increase support stiffness relative to the handrail body 22.

Second Embodiment

Next, a second embodiment will be described. Note that parts equivalent to those of the first embodiment are denoted by the same reference numerals. Therefore, a detailed description will be omitted as appropriate.

As shown in FIG. 9, in this second embodiment, the predetermined position in the lower wall portion 26D of the rail portion body 26 constituting the rail portion 24, the movement of the main roller 36 in the slide member 30 provided at one end portion of the link arm 40 (rolling) only that the protrusion 27 as a limiting structure for temporarily limiting is provided is different from the first embodiment.

The main roller 36 provided on the slide member 30 rolls on the inner surface (bottom surface) of the lower wall portion 26D of the rail portion body 26, one end portion 26A of the rail portion body 26 (see FIG. 3: hereinafter the same) so that it can be temporarily prevented from moving to the side, the protrusion 27 as a limiting structure may be configured. Protrusion 27 shown in FIG. 9, the other end portion 26B in the lower wall portion 26D of the rail portion body 26 (see FIG. 3: hereinafter the same) is cut and raised protrusion 27A formed by cutting and raised part of the side.

That is, by the main roller 36 hits from the other end portion 26B of the lower wall portion 26D to the cut and raised protrusion 27A (protrusion 27), to move to one end portion 26A of the rail portion 24 (rail portion body 26) (rolling) is adapted to be temporarily prevented. Then, with the movement of the slide door 16, one end portion of the link arm 40 (slide member 30) is pulled by a predetermined force to one end portion 26A of the rail portion 24 (rail portion body 26). At this time, the main roller 36 passes over the cut and raised protrusion 27A (protrusion 27), it is adapted to move (rolling) to one end portion 26A of the rail portion 24 (rail portion body 26).

Figure 10A:
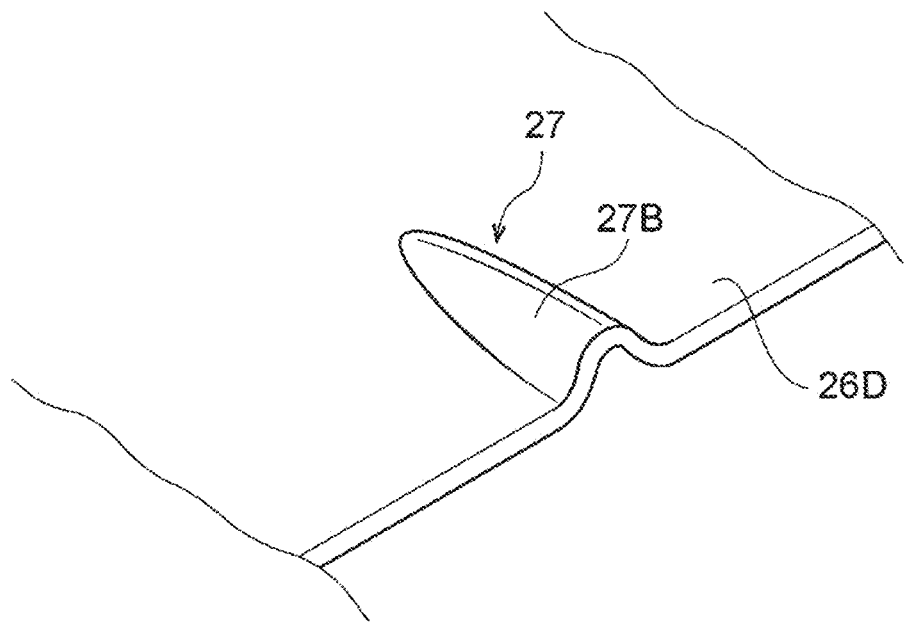
FIG. 10A is an enlarged perspective view of a first modification of an entrance handrail according to a second embodiment.
Figure 10B:
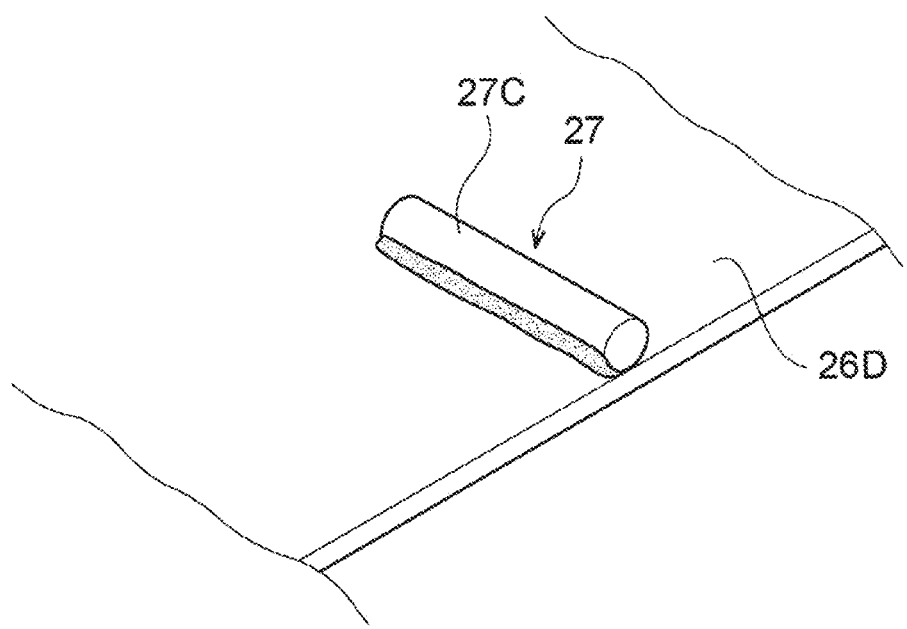
FIG. 10B is an enlarged perspective view of a second modification of the entrance handrail according to the second embodiment.

Therefore, it is preferable that the protrusion 27 is configured to be elastically deformable downward like the cut and raised protrusion 27A. However, the protrusion 27 is not limited to the cut and raised protrusion 27A shown in FIG. 9. For example, as shown in 10A, the protrusion 27 may be a bulge protrusion 27B that is deformed so as to cause a part of the lower wall portion 26D to bulge upward. Further, for example, as shown in FIG. 10B, the protrusion 27 may be a cylindrical protrusion 27C formed by attaching a cylindrical member by welding or the like.

Further, cut and raised protrusion 27A shown in FIG. 9 is drawn a little away from the main roller 36. However, the protrusion 27, from the position of the slide member 30 when the slide door 16 is closing the entrance 14, is intended to limit the slide member 30 so as not to move temporarily. Therefore, it is preferably formed adjacent to the main roller 36 of the slide member 30 which is located on the other end portion 26B of the rail portion 24 (rail portion body 26).

Further, the width of the slit portion 26S in the second embodiment (vertical gap), the main roller 36 is protrusion 27 (cut and raised protrusion 27A, bulge protrusion 27B, cylindrical protrusion 27C) upper wall portion 32U when overcoming It has a width to the extent that does not interfere with the movement to the upper side.

Next, the operation of the entrance handrail 20 according to the second embodiment configured as described above will be described. The description of the same functions as those of the first embodiment will be omitted as appropriate.

Further, in FIGS. 11 to 14, only the rail portion 24 is shown as an entrance handrail 20. However, the handrail body 22 rotates integrally with the rail portion 24 at the upper side of the rail portion 24. Therefore, its operation is the same as the rail portion 24. Therefore, even if only the rail portion 24 is shown, the following description is referred to as "handrail body 22 and the rail portion 24".

Figure 11:
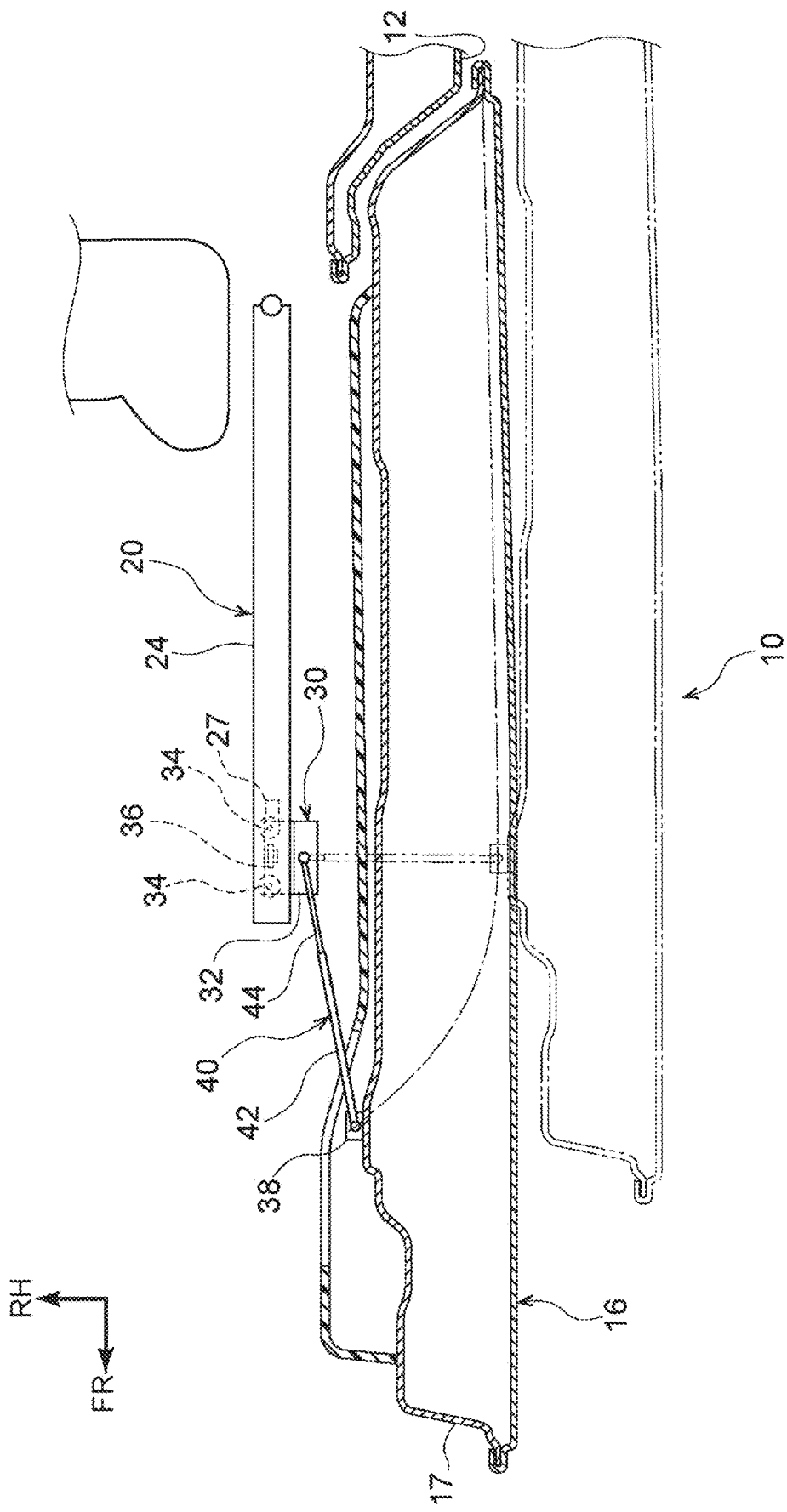
FIG. 11 is a plan view schematically showing the attitude of the entrance handrail according to the second embodiment from a state in which the slide door closes the entrance to a state in which the slide door is slightly opened.

As shown in FIG. 11, even if the entrance 14 begins to be opened by the slide door 16, the slide member 30 provided at one end portion of the link arm 40, the other end portion 26B of the rail portion 24 (rail portion body 26) position condition is maintained. That is, the main roller 36 hits the protrusion 27 (cut and raised protrusion 27A). Thereby, the movement (rolling) thereof is prevented. Therefore, the link arm 40 is shortened with the movement of the slide door 16.

That is, while the slide member 30 is positioned on the other end portion 26B of the rail portion 24 (rail portion body 26), by the movement of the slide door 16, relatively small-diameter rod 44 is pressed toward the large-diameter rod 42 (with respect to the link arm 40, an external force toward its axial inward acts) is housed therein. At this time, the link arm 40 has a minimum length.

Figure 12:
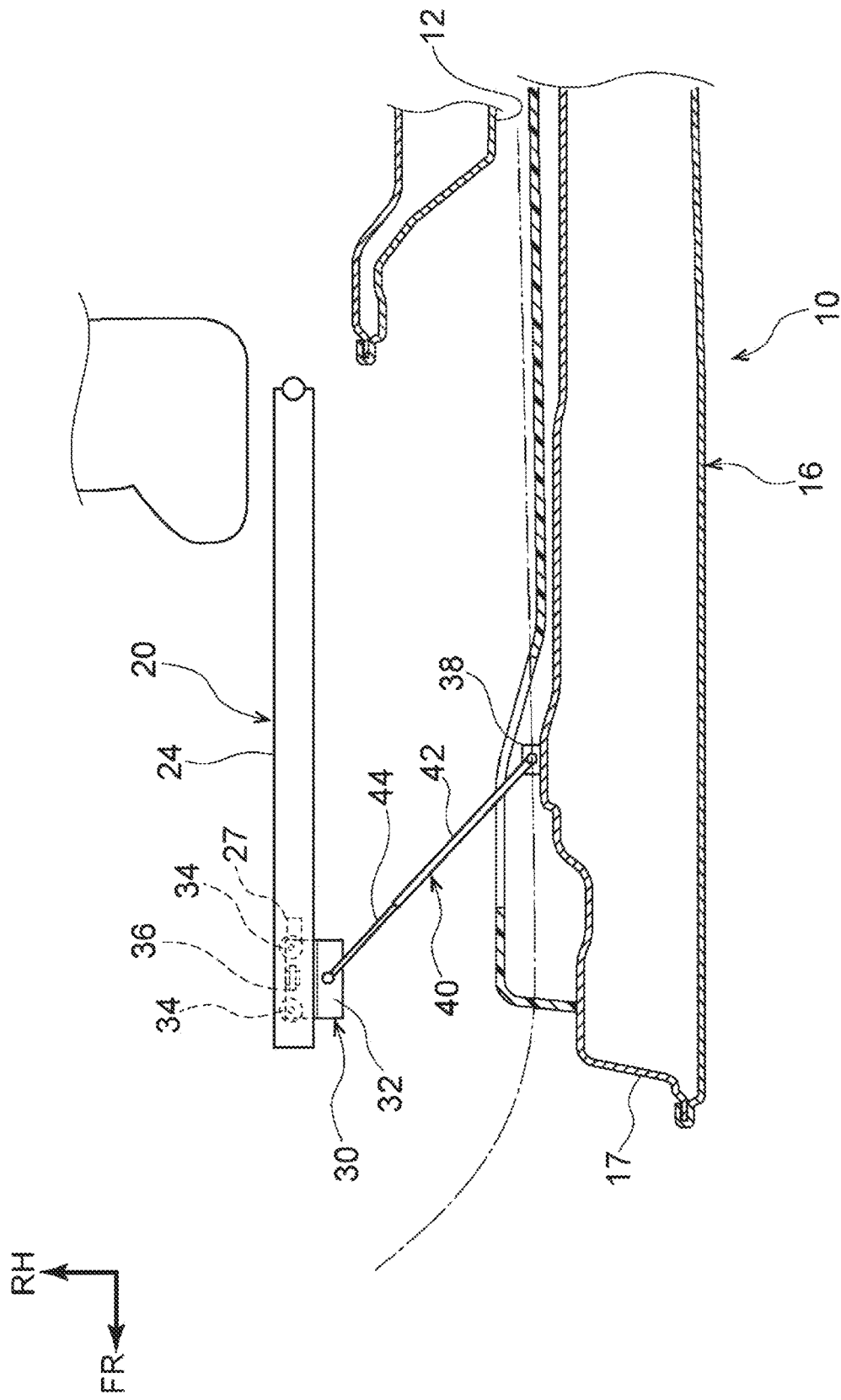
FIG. 12 is a plan view schematically showing a state of the entrance handrail according to the second embodiment during opening of the slide door.

Then, as shown in FIG. 12, when the slide door 16 is moved further rearward, while the slide member 30 is positioned on the other end portion 26B of the rail portion 24 (rail portion body 26), the link arm 40 is extended. That is, since the movement of the main roller 36 (rolling) is prevented, by the movement of the slide door 16, relatively small-diameter rod 44 is pulled out from the inside of the large-diameter rod 42 (with respect to the link arm 40, the external force toward the axial outside acts). At this time, the link arm 40 becomes the maximum length again.

Figure 13:
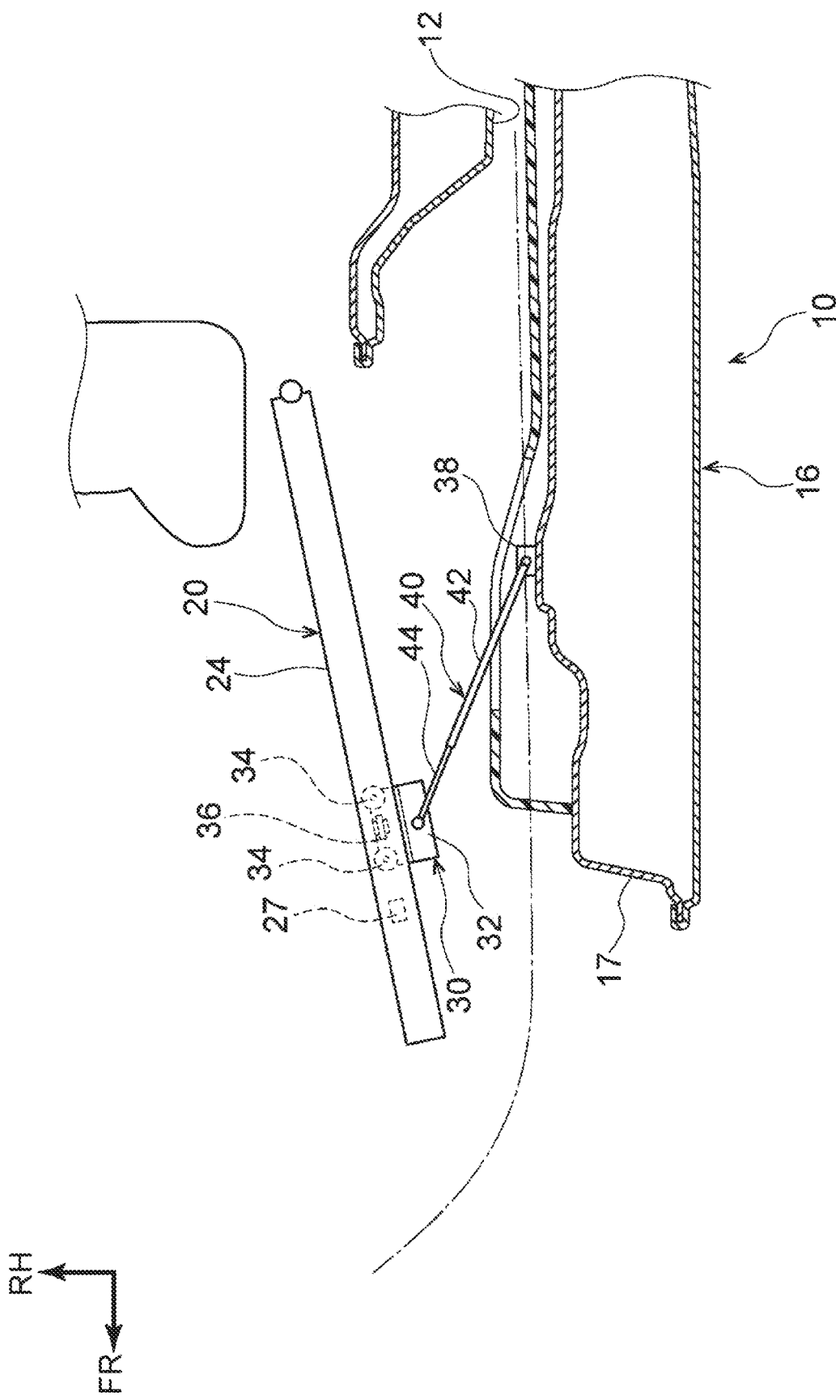
FIG. 13 is a plan view schematically showing a state of the entrance handrail according to the second embodiment during opening of the slide door.

Then, as shown in FIG. 13, when the slide door 16 is moved further rearward, the link arm 40 cannot extend any further. Therefore, via the link arm 40, the slide member 30, along the rail portion 24 (rail portion body 26), begins to slide toward one end portion 26A of the rail portion 24 (rail portion body 26).

That is, the main roller 36 passes over the protrusion 27 (cut and raised protrusion 27A), the main roller 36 starts to roll on the inner surface (bottom) of the lower wall portion 26D toward the one end portion 26A of the rail portion 24 (rail portion body 26). Then, with it, the rail portion 24 (rail portion body 26) is also pulled to the link arm 40. Therefore, the rail portion 24 (rail portion body 26 and the connecting member 25), one end portion 25A thereof (see FIG. 3: hereinafter the same) the other end portion 26B as a pivot fulcrum starts to rotate toward the outside of the vehicle (vehicle width direction outer).

Then, as shown in FIG. 14, the slide door 16 is further moved to the rear side to open the entrance 14. At this time, the slide member 30 is positioned at one end portion 26A of the rail portion 24 (rail portion body 26), the rail portion 24 (rail portion body 26 and the connecting member 25), the other end portion 26B as a pivot fulcrum its one end portion 25A side is fully rotated toward the outside of the vehicle (vehicle width direction outer). That is, the handrail body 22 and the rail portion 24 are in a deployed posture protruding toward the outside of the vehicle.

Thus, in the second embodiment, the protrusion 27 as a limiting structure provided on the rail portion 24 (rail portion body 26), along the rail portion 24 (rail portion body 26), the slide member 30 provided at one end portion of the link arm 40, the rail portion 24 (rail portion body 26) sliding to one end portion 26A is temporarily limited. Therefore, the handrail body 22 and the rail portion 24 from the initial stage of the slide door 16 opens the entrance 14 is rotated by being pulled to the link arm 40.

Therefore, the slide member 30, after being positioned at one end portion 26A of the rail portion 24 (rail portion body 26) (at the final stage when the opening operation of the slide door 16 is completed), the handrail body 22 and the rail portion 24 is pulled to the link arm 40 as compared with the configuration to rotate toward the outside of the vehicle, the handrail body 22 and the rail portion 24 can reduce the rotational speed when rotating to the outside of the vehicle. That is, according to the second embodiment, as compared with the first embodiment, the handrail body 22 and the rail portion 24 can be suppressed or prevented from suddenly jumping out of the vehicle.

Further, the limiting structure is constituted by a protrusion 27 formed on the lower wall portion 26D of the rail portion 24 (rail portion body 26). That is, when the slide member 30 provided at one end portion of the link arm 40 is pulled by a predetermined force to one end portion 26A of the rail portion 24 (rail portion body 26), the main roller 36 is ridden restricted structure by the protrusion 27 of the degree is configured. Therefore, the configuration of the limiting structure can be simplified as compared with a case where the limiting structure is not constituted by such a protrusion 27. Further, the manufacturing cost of the entrance handrail 20 may be reduced.

Third Embodiment

Finally, a third embodiment will be described. Note that parts equivalent to those of the first embodiment are denoted by the same reference numerals. Detailed description is omitted as appropriate.

As shown in FIG. 15A and FIG. 15B, in this third embodiment, between the large-diameter rod 42 and the small-diameter rod 44 of the link arm 40, a compression coil spring (hereinafter, simply referred to as "coil spring") 46 as an urging member for constantly urging the small-diameter rod 44 to the inside of the large-diameter rod 42 (for constantly urging in a direction to shorten the total length of the link arm 40) is provided. Only this point is different from the first embodiment.

That is, one end portion 46A of the coil spring 46 is in contact with the flange portion 42F formed so as to protrude radially inward on one end portion 42A of the large-diameter rod 42, the other end portion 46B of the coil spring 46 is formed so as to protrude radially outward on the other end portion 44B of the small-diameter rod 44 It is in contact with the flange portion 44F. Thus, so as to urge the flange portion 42F and the flange portion 44F in a direction spaced from each other.

Next, the operation of the entrance handrail 20 according to the third embodiment configured as described above will be described. The description of the operations common to the first embodiment and the second embodiment will be omitted as appropriate.

Figure 18:
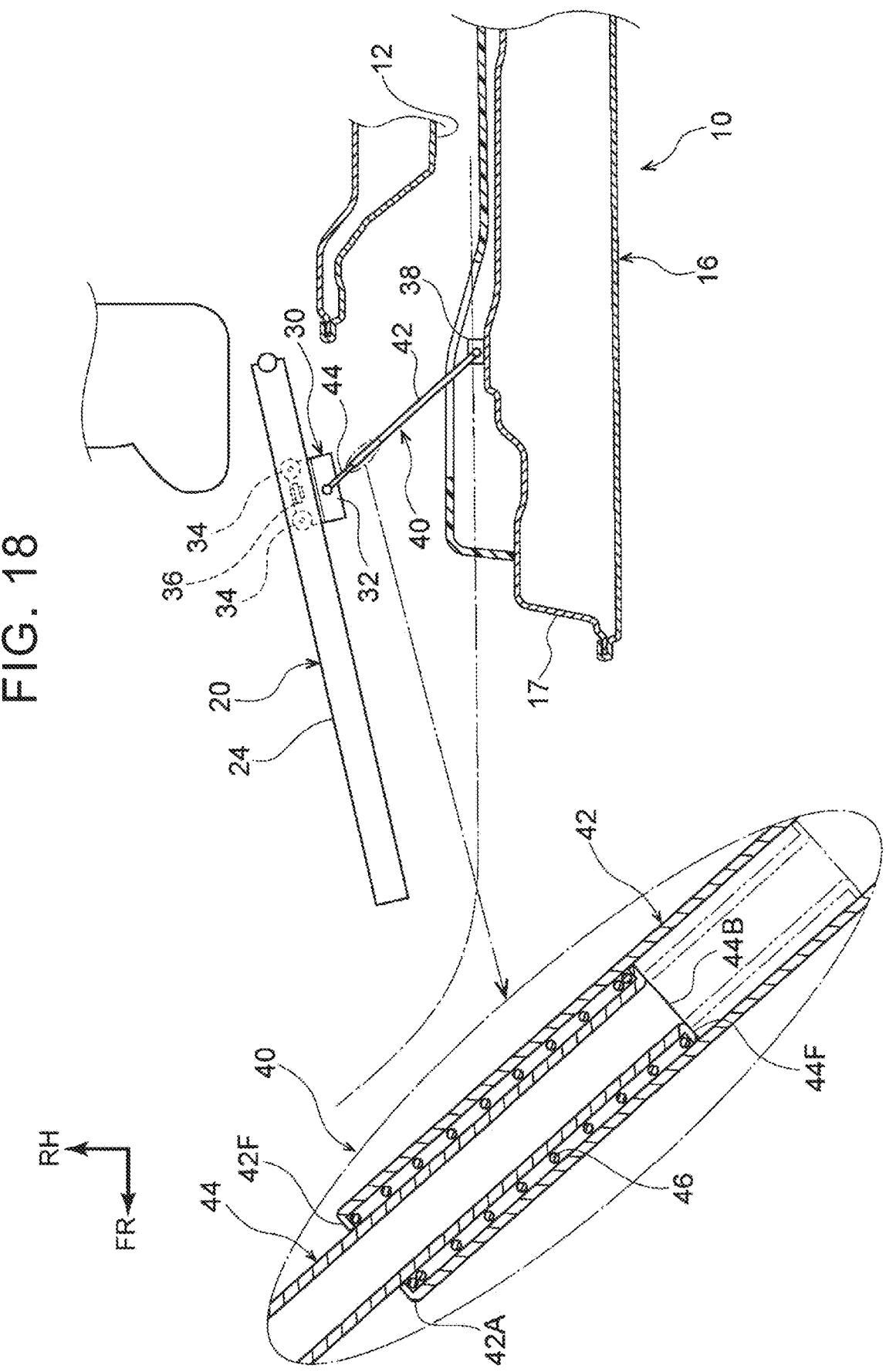
FIG. 18 is a plan view schematically showing a state of an entrance handrail according to a third embodiment during opening of a slide door.

Further, in FIGS. 16 to 18, as the entrance handrail 20 for getting on and off, only the rail portion 24 is shown. However, since the handrail body 22 rotates integrally with the rail portion 24 at the upper side of the rail portion 24, its operation is the same as the rail portion 24. Therefore, the following description is referred to as "handrail body 22 and the rail portion 24" even if only the rail portion 24 is illustrated.

As shown in FIG. 16, the link arm 40 has a maximum length when the handrail body 22 and rail portion 24 take a retracted posture to be positioned along the slide door 16. That is, the small-diameter rod 44 is pulled out from the inside of the large-diameter rod 42 to the maximum extent against the urging force of the coil spring 46.

In this state, entrance 14, even if it begins to be opened by the slide door 16, as shown in FIG. 17, the slide member 30 provided at one end portion of the link arm 40, the other end portion 26B of the rail portion 24 (rail portion body 26) (see FIG. 3: hereinafter the same) to maintain a state located on the side.

That is, the link arm 40, the urging force of the coil spring 46, the small-diameter rod 44 is urged in a direction to be accommodated inside the large-diameter rod 42. Therefore, the link arm 40 is only shortened to the minimum length with the movement of the slide door 16, with respect to the slide member 30, one end portion 26A of the rail portion 24 (rail portion body 26) (see FIG. 3: hereinafter the same) external force to slide (move) to the side does not act.

Then, when the slide door 16 is further moved rearward, as shown in FIG. 18, the slide member 30 is pulled by the link arm 40 while the link arm 40 is gradually extended against the urging force of the coil spring 46 (while the relatively small-diameter rod 44 is gradually pulled out from the inside of the large-diameter rod 42).

Thus, the slide member 30, along the rail portion 24 (rail portion body 26), with beginning to slide toward one end portion 26A of the rail portion 24 (rail portion body 26), the link arm 40 by the urging force of the coil spring 46 is difficult to extend, the rail portion 24 (rail portion body 26 and the connecting member 25), one end portion 25A thereof (see FIG. 3: hereinafter the same) the other end portion 26B side as a pivot fulcrum starts to rotate toward the outside (vehicle width direction outer).

Thereafter, when the slide door 16 is further moved to the rear side to open the entrance 14, FIG. 8, as shown in FIG. 14, the slide member 30 is positioned at one end portion 26A of the rail portion 24 (rail portion body 26), the rail portion 24 (rail portion body 26 and the connecting member 25), the other end portion 26B as a pivot fulcrum its one end portion 25A side is fully rotated toward the outside of the vehicle (vehicle width direction outer). That is, the handrail body 22 and the rail portion 24 are in a deployed posture protruding toward the outside of the vehicle.

Thus, according to the third embodiment, the coil spring 46 provided on the link arm 40, the link arm 40 is always urged in a direction to shorten the total length of the link arm 40. Therefore, even if the protrusion 27 as a limiting structure as in the second embodiment is not provided, the handrail body 22 and the rail portion 24 from the initial stage of opening the slide door 16 opens the entrance 14 is pulled to the link arm 40 rotates.

Therefore, the slide member 30, from being positioned at one end portion 26A of the rail portion 24 (rail portion body 26) (at the final stage when the opening operation of the slide door 16 is completed), as compared with the configuration in which the handrail body 22 and the rail portion 24 is rotated toward the outside of the vehicle by being pulled to the link arm 40, the handrail body 22 and the rail portion 24 is rotated to the outside of the vehicle rotational speed can be reduced. That is, according to the third embodiment, as compared with the first embodiment, the handrail body 22 and the rail portion 24 can be suppressed or prevented from suddenly jumping out of the vehicle.

As described above, the entrance handrail 20 according to the present embodiment has been described on the basis of the drawings, but the entrance handrail 20 according to the present embodiment is not limited to the one shown in the drawings, and the entrance handrail 20 according to the present embodiment can be appropriately changed in design without departing from the gist of the present disclosure. For example, in the first embodiment, the inner surface of the lower wall portion 26D of the rail portion body 26 (bottom surface), a belt-shaped frictional member to impart a frictional force (sliding resistance) to the rolling of the main roller 36 (not shown), along the longitudinal direction of the inner surface (bottom) it may be provided at a predetermined length.

When providing such a friction member, rolling of the main roller 36 in the slide member 30 is blunted by the friction member. Therefore, prior to the slide member 30 consequently reaches one end portion 26A of the rail portion body 26, so that the handrail body 22 and the rail portion 24 is pulled to the link arm 40. That is, even in such a configuration, the handrail body 22 and the rail portion 24 from the initial stage of the slide door 16 is an opening operation to open the entrance 14 will be rotated by being pulled to the link arm 40.

Therefore, the slide member 30, from being positioned at one end portion 26A of the rail portion 24 (rail portion body 26) (at the final stage when the opening operation of the slide door 16 is completed), the handrail body 22 and the rail portion 24 is pulled to the link arm 40 as compared with the configuration to rotate toward the outside of the vehicle, the handrail body 22 and the rail portion 24 can reduce the rotational speed when rotating to the outside of the vehicle. That is, even with such a configuration, as compared with the first embodiment, the handrail body 22 and the rail portion 24 can be suppressed or prevented from suddenly jumping out of the vehicle.

Incidentally, the inner surface of the lower wall portion 26D of the rail portion body 26 in the second embodiment (bottom), such a frictional member, and may be provided on one end portion 26A than the protrusion 27. Further, such a frictional member may be provided on the inner surface of the lower wall portion 26D of the rail portion body 26 in the third embodiment (the bottom surface). Further, the limiting structure is not limited to the protrusion 27. For example, by such frictional member as described above is attached to a predetermined position of the inner surface of the lower wall portion 26D is formed in a rectangular parallelepiped shape or the like (bottom), the limiting structure may be configured.

Further, the configuration in which the handrail body 22 and the rail portion 24 are integrally coupled is not limited to the coupling member 28 shown in the drawings. For example, although not shown, the other end portion 22B of the handrail body 22 is extended downward, its extended other end (lower end) may be integrally coupled to the other end portion 26B of the rail portion 24 (rail portion body 26). That is, the coupling member 28 may be omitted. Further, the shape of the coupling member 28 is not limited to the illustrated shape.

What is claimed is:

1. An entrance handrail in combination with a vehicle comprising:
    a rail portion of which one end portion is rotatably provided around an entrance of a vehicle with a vehicle body vertical direction as an axial direction, and of which a second end portion is rotatably attached to a slide door for opening and closing the entrance and holds one end portion of a link arm that expands and contracts with movement of the slide door such that the one end portion of the link arm is able to slide; and
    a handrail body of which one end portion is rotatably provided around the entrance on a vehicle body upper side with respect to the one end portion of the rail portion with the vehicle body vertical direction as the axial direction, and that is configured to rotate together with the rail portion and that is able to be held by an occupant getting on and off the vehicle from the entrance, wherein in a plan view, in a state where the slide door closes the entrance, the rail portion and the handrail body are placed in a retracted posture in which the rail portion and the handrail body are positioned along the slide door with the one end portion of the link arm positioned on the second end portion side of the rail portion, and in a state where the slide door opens the entrance, the rail portion and the handrail body are placed in a deployed posture in which the rail portion and the handrail body project outward of the vehicle with the one end portion of the link arm positioned on the one end portion side of the rail portion.

2. The entrance handrail according to claim 1, wherein the one end portion of the link arm includes a rolling member that rolls in contact with an inner surface of the rail portion.

3. The entrance handrail according to claim 2, wherein the rail portion includes a limiting structure for temporarily limiting rolling of the rolling member to the one end portion side of the rail portion.

4. The entrance handrail according to claim 3, wherein:
    the limiting structure is composed of a protrusion provided on the rail portion; and
    the protrusion is configured such that the rolling member climbs over the protrusion, when the one end portion of the link arm is pulled with a predetermined force to the one end portion side of the rail portion.

5. The entrance handrail according to claim 1, wherein the link arm includes an urging member for urging the link arm in a direction in which an overall length of the link arm is shortened.

6. The entrance handrail according to claim 1, wherein the handrail body is configured to rotate together with the rail portion when a second end portion of the handrail body and the second end portion of the rail portion are integrally coupled.

* * * * *